United States Patent
Choi et al.

(10) Patent No.: US 10,769,944 B2
(45) Date of Patent: *Sep. 8, 2020

(54) METHOD FOR PROCESSING MESSAGE AND ELECTRONIC DEVICE IMPLEMENTING THE SAME

(71) Applicant: SAMSUNG ELECTRONICS CO., LTD., Suwon-si, Gyeonggi-do (KR)

(72) Inventors: Inyoung Choi, Seoul (KR); Jongsung Joo, Seoul (KR); Seungchul Lee, Hwaseong-si (KR); Jehyun Lee, Seoul (KR); Kiho Cho, Yongin-si (KR); Hyoungtak Cho, Yongin-si (KR); Areum Choi, Suwon-si (KR); Soyoung Lee, Gwacheon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/655,269

(22) Filed: Oct. 17, 2019

(65) Prior Publication Data

US 2020/0051432 A1 Feb. 13, 2020

Related U.S. Application Data

(63) Continuation of application No. 16/113,110, filed on Aug. 27, 2018, now Pat. No. 10,475,339.

(30) Foreign Application Priority Data

Aug. 28, 2017 (KR) .................. 10-2017-0108666

(51) Int. Cl.
*G08G 1/16* (2006.01)
*G08G 1/09* (2006.01)
(Continued)

(52) U.S. Cl.
CPC ......... *G08G 1/093* (2013.01); *G08G 1/09675* (2013.01); *G08G 1/096716* (2013.01);
(Continued)

(58) Field of Classification Search
CPC .... G06F 3/0488; G06F 3/167; G06F 3/04842; G06F 3/04886; G06F 1/163;
(Continued)

(56) References Cited

U.S. PATENT DOCUMENTS 5,367,557 A 11/1994 Ozenbaugh, II
6,957,128 B1 10/2005 Ito et al.
(Continued)

FOREIGN PATENT DOCUMENTS

JP 2001-143191 5/2001
JP 2016-100028 5/2016
WO 2017/033486 3/2017

OTHER PUBLICATIONS

U.S. Appl. No. 16/113,110, filed Aug. 27, 2018.
(Continued)

*Primary Examiner* — Daniel Previl
(74) *Attorney, Agent, or Firm* — Nixon & Vanderhye P.C.

(57) ABSTRACT

In an example embodiment, an electronic device includes a communication module comprising communication circuitry, a display, a sound output device comprising sound output circuitry, a processor, and a memory. Instructions stored in the memory, when executed by the processor, causes the electronic device to control the communication module to transmit and/or receive a plurality of pieces of wireless access in vehicular environment (WAVE) information. In addition, the electronic device identifies a plurality of events, based on the plurality of pieces of WAVE information, and generates a plurality of messages related to the plurality of events. The electronic device further determines
(Continued)

priorities of the plurality of messages, based on status information of the electronic device, and outputs the plurality of messages based on the determined priorities through at least one of the display and the sound output device.

20 Claims, 23 Drawing Sheets

(51) Int. Cl.
  *G08G 1/0967* (2006.01)
  *H04W 4/40* (2018.01)
  *H04W 4/12* (2009.01)
  *H04W 4/90* (2018.01)

(52) U.S. Cl.
  CPC ....... *G08G 1/096791* (2013.01); *G08G 1/162* (2013.01); *H04W 4/12* (2013.01); *H04W 4/40* (2018.02); *H04W 4/90* (2018.02)

(58) Field of Classification Search
  CPC .. G06F 3/04817; G06F 3/0482; G06F 1/1652; G06F 3/017; G06F 3/0416; G06F 3/0481; G06F 3/04845; G06F 3/04883; G06F 1/16; G06F 2203/04105; G06F 3/038; G06F 13/385; G06F 13/4282; G06F 1/1601; G06F 1/1632; G06F 21/32; G06F 2203/04803; G06F 3/0304; G06F 3/0346; G06F 3/0484; G06F 3/04847; G06F 3/16; G06F 16/90332; G06F 16/9535; G06F 17/27; G06F 17/278; G06F 17/279; G06F 17/28; G06F 1/1626; G06F 1/1677; G06F 1/181; G06F 1/266; G06F 2203/04108; G06F 3/011; G06F 3/041; G06F 3/0412; G06F 3/0414; G06F 3/162; G06F 3/165; G06F 9/451; G06F 16/2425; G06F 16/24573; G06F 16/3225; G06F 16/38; G06F 16/41; G06F 16/487; G06F 16/50; G06F 16/58; G06F 16/739; G06F 16/90335; G06F 16/907; G06F 16/951; G06F 1/1607; G06F 1/1643; G06F 1/1669; G06F 1/1681; G06F 1/1688; G06F 1/1694; G06F 1/3206; G06F 1/3231; G06F 1/3265; G06F 1/3296; G06F 21/31; G06F 21/34; G06F 21/35; G06F 21/45; G06F 21/53; G06F 21/602; G06F 21/6209; G06F 21/6218; G06F 21/6245; G06F 2200/1636; G06F 2200/1637; G06F 2203/0382; G06F 2203/04102; G06F 2203/04104; G06F 2203/04804; G06F 2203/04808; G06F 2213/0042; G06F 2213/3806; G06F 2221/2153; G06F 3/01; G06F 3/012; G06F 3/013; G06F 3/014; G06F 3/016; G06F 3/03; G06F 3/0338; G06F 3/03545; G06F 3/03547; G06F 3/0362; G06F 3/0418; G06F 3/042; G06F 3/044; G06F 3/0483; G06F 3/0485; G06F 3/0486; G06F 3/1423; G06F 3/1438; G06F 3/1454; G06F 3/147; G06F 9/4415; G06F 9/4843; H04W 4/80; H04W 12/06; H04W 88/02; H04W 8/005; H04W 76/10; H04W 4/021; H04W 76/14; H04W 8/18; H04W 4/12; H04W 4/38; H04W 4/40; H04W 4/50; H04W 84/12; H04W 8/183; H04W 12/00; H04W 12/00403; H04W 12/04; H04W 24/04; H04W 40/24; H04W 48/10; H04W 4/00; H04W 4/02; H04W 4/024; H04W 4/029; H04W 4/16; H04W 4/18; H04W 4/70; H04W 4/90; H04W 52/225; H04W 52/226; H04W 52/228; H04W 52/267; H04W 52/283; H04W 52/34; H04W 52/367; H04W 56/002; H04W 64/006; H04W 68/005; H04W 72/02; H04W 76/11; H04W 76/15; H04W 76/27; H04W 76/34; H04W 84/18; H04W 84/20; H04W 88/005; H04W 88/04; H04W 88/06; H04W 88/16; H04W 8/186; H04W 8/20; H04W 8/205; H04W 8/22; G10L 15/22; G10L 15/265; G10L 15/30; G10L 2015/223; G10L 15/08; G10L 15/1815; G10L 17/00; G10L 19/00; G10L 2021/02166; G10L 21/0208; G10L 21/0232; G10L 25/84; G05B 15/02; G05B 2219/2642; G05B 19/042; G05B 2219/23227; H04M 1/72522; H04M 1/72519; H04M 2250/22; H04M 2250/74; H04M 1/274516; H04M 1/7253; H04M 1/0202; H04M 1/0268; H04M 1/274508; H04M 1/725; H04M 1/72533; H04M 1/72569; H04M 1/72583; H04M 3/4936; H04M 1/0216; H04M 1/0243; H04M 1/026; H04M 1/274533; H04M 1/27455; H04M 1/575; H04M 1/6075; H04M 1/72527; H04M 1/72552; H04M 1/72563; H04M 1/72572; H04M 1/72597; H04M 2201/36; H04M 2203/60; H04M 2250/12; H04M 3/2218; H04M 3/42068; H04M 3/42365; H04M 3/436; H04B 5/0031; H04B 1/385; H04B 1/3888; H04B 5/0037; H04B 5/0075; H04B 1/3838; H04B 1/48; H04B 2001/3861; H04B 2001/485; H04B 5/0087; H04B 5/02; H04L 63/0861; H04L 12/282; H04L 63/062; H04L 63/0876; H04L 67/12; H04L 67/125; H04L 67/26; H04L 67/34; H04L 12/2809; H04L 12/2812; H04L 12/2818; H04L 12/2827; H04L 12/2838; H04L 2012/2841; H04L 2012/2849; H04L 29/08; H04L 41/22; H04L 45/74; H04L 47/32; H04L 47/50; H04L 61/2007; H04L 63/0414; H04L 63/0478; H04L 63/0492; H04L 63/061; H04L 63/08; H04L 63/0853; H04L 63/107; H04L 63/108; H04L 67/02; H04L 67/025; H04L 67/06; H04L 67/22; H04L 67/306; H04L 67/36; H04L 67/42; H04L 9/0819; H04L 9/12; H04L 9/30; G06K 9/0002; G06K 9/00033; G06K 9/0004; G06K 9/00288; G06K 9/00375; G06K 9/00664; G06K 19/07779; G06K 2009/00328; G06K 2009/00738; G06K 2009/00939; G06K 2209/27; G06K 9/00; G06K 9/00006; G06K 9/0008; G06K 9/00087; G06K 9/001; G06K 9/00268; G06K 9/00281; G06K 9/00302; G06K 9/00342; G06K 9/00362; G06K 9/00496; G06K 9/0057; G06K 9/00671; G06K 9/00744; G06K 9/00751; G06K 9/00758; G06K 9/00771; G06K 9/00892; G06K 9/00979; G06K 9/3233; G06K 9/46; G06K 9/6201; G06K 9/72; G09G 2354/00; G09G 2320/068;

G09G 2340/04; G09G 2370/022; G09G 2370/025; G09G 2370/16; G09G 2380/06; G09G 2380/16; G09G 5/003; G09G 2300/0452; G09G 2310/0232; G09G 2320/0233; G09G 2320/046; G09G 2320/048; G09G 2320/0633; G09G 2330/022; G09G 2340/0464; G09G 2340/10; G09G 2340/12; G09G 2340/14; G09G 2340/145; G09G 2360/144; G09G 2380/02; G09G 3/20; G09G 3/2003; G09G 3/2096; G09G 3/3208; G09G 3/3233; G09G 5/00; G09G 5/10; G09G 5/363; G16H 20/30; G16H 40/63; G16H 10/00; G16H 10/20; G16H 10/60; G16H 20/60; G16H 20/70; G16H 30/20; G16H 40/67; G16H 50/70; H04N 21/41407; H04N 5/232; H04N 9/045; H04N 1/00; H04N 21/43615; H04N 21/43632; H04N 21/43637; H04N 21/440218; H04N 21/44218; H04N 5/23212; H04N 5/232122; H04N 5/23245; H04N 5/3696; H04N 5/36961; H04N 5/37457; H04N 5/3765; H04N 5/378; H04N 9/04; H04N 13/243; H04N 13/25; H04N 13/254; H04N 13/271; H04N 13/296; H04N 1/212; H04N 2007/145; H04N 21/2143; H04N 21/4126; H04N 21/4131; H04N 21/42202; H04N 21/431; H04N 21/4532; H04N 2201/0084; H04N 2209/045; H04N 5/2257; H04N 5/23203; H04N 5/23206; H04N 5/23218; H04N 5/23225; H04N 5/23229; H04N 5/23232; H04N 5/23238; H04N 5/23277; H04N 5/23293; H04N 5/23299; H04N 5/235; H04N 5/2355; H04N 5/265; H04N 5/349; H04N 5/91; H04N 7/0122; H04N 7/147; H04N 7/18; H04N 9/07; H04N 9/735; A61B 5/02416; A61B 5/0022; A61B 5/02055; A61B 5/021; A61B 5/02108; A61B 5/02125; A61B 5/0402; A61B 5/12; A61B 5/14552; A61B 5/681; A61B 5/6898; A61B 5/721; A61B 5/7235; A61B 5/7405

USPC .... 340/903, 438, 568.1, 904–907, 990, 994, 340/995.1, 995.13, 995.17, 996, 427

See application file for complete search history.

(56) References Cited

U.S. PATENT DOCUMENTS

| | | | |
|---|---|---|---|
| 8,930,041 B1 | 1/2015 | Grimm et al. | |
| 9,924,452 B2* | 3/2018 | Nathanson | G07C 5/0808 |
| 2011/0128902 A1* | 6/2011 | Guo | G08G 1/161 |
| | | | 370/312 |
| 2011/0148659 A1* | 6/2011 | Ueno | G08G 1/09675 |
| | | | 340/905 |
| 2012/0127874 A1 | 5/2012 | Oh et al. | |
| 2012/0163269 A1* | 6/2012 | Shuster | G06F 3/0485 |
| | | | 370/312 |
| 2013/0038437 A1* | 2/2013 | Talati | B60K 35/00 |
| | | | 340/438 |
| 2013/0311291 A1 | 11/2013 | Ward | |
| 2014/0167954 A1 | 6/2014 | Johnson | |
| 2014/0211645 A1* | 7/2014 | Sekine | H04W 48/12 |
| | | | 370/252 |
| 2015/0186194 A1 | 7/2015 | Weigand | |
| 2017/0034774 A1 | 2/2017 | Nathanson et al. | |
| 2019/0066496 A1* | 2/2019 | Choi | H04W 4/12 |

OTHER PUBLICATIONS

International Search Report and Written Opinion dated Nov. 29, 2018 in counterpart International Patent Application No. PCT/KR2018/009883.

Partial Extended European Search Report dated Jul. 24, 2020 for EP Application No. 18851462.4.

* cited by examiner

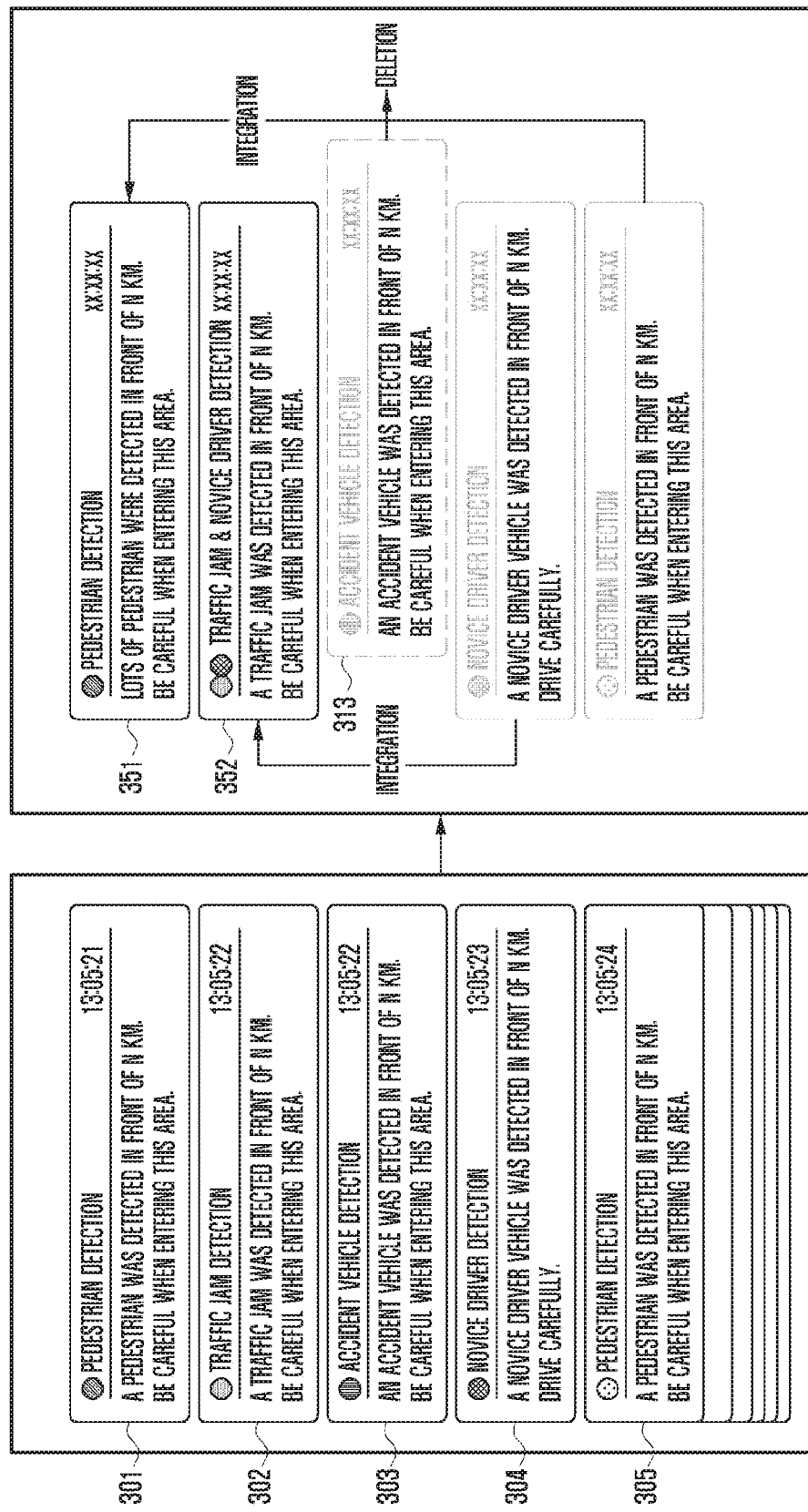

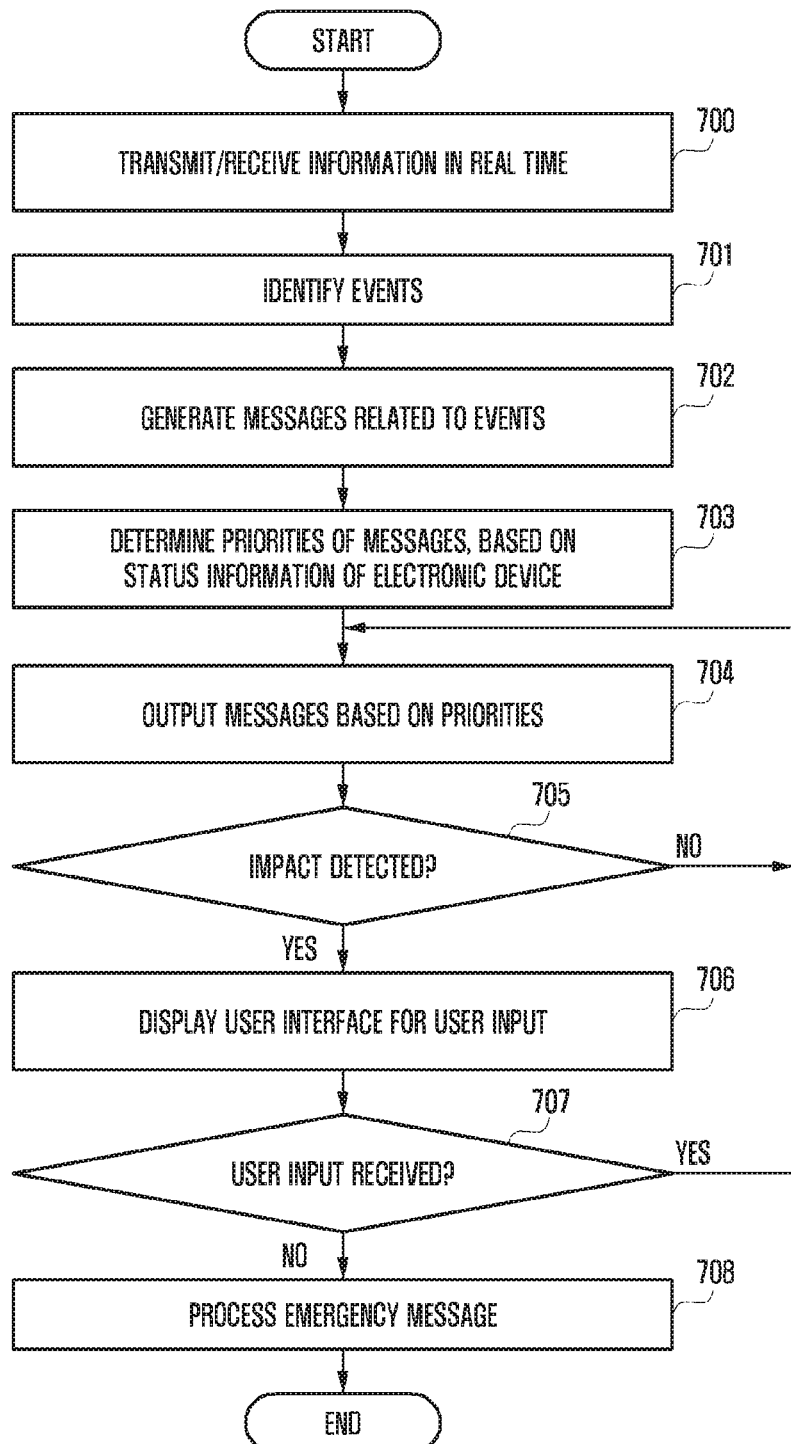

METHOD FOR PROCESSING MESSAGE AND ELECTRONIC DEVICE IMPLEMENTING THE SAME

CROSS-REFERENCE TO RELATED APPLICATION

This application is a Continuation of U.S. application Ser. No. 16/113,110, filed Aug. 27, 2018, which claims priority to KR 10-2017-0108666, filed Aug. 28, 2017, the entire contents of which are all hereby incorporated herein by reference.

TECHNICAL FIELD

The present disclosure relates to a method for processing a message and to an electronic device implementing the method.

BACKGROUND

With the recent growth of communication, a communication technology for an electronic device to process information related to a running vehicle has been also developed. A vehicle-to-everything (V2X) technology is one of remarkable technologies. The V2X technology may cover vehicle-to-vehicle communication (V2V), vehicle-to-road infrastructure communication (V2I), and vehicle-to-cloud communication (V2N). The electronic devices may include a communication module for supporting the V2X technology. This communication module complies with the IEEE 802.11p standard.

Accordingly, using information transmitted between vehicles, the electronic device can accurately grasp traffic information around a vehicle in real time without a communication network infrastructure. This system is more accurate than a traditional navigation system.

However, because the electronic device that uses the V2X technology transmits or receives a traffic information message to or from nearby electronic devices, this often causes excessive message transmission and a waste of network resources.

Also, as the electronic device receives messages indiscriminately, the user of the electronic device may not be able to selectively perceive important messages.

SUMMARY

According to various embodiments of the present disclosure, an electronic device is capable of processing messages in the order of priorities to provide more meaningful information to a user quickly.

According to various embodiments of the present disclosure, an electronic device may include a communication module comprising communication circuitry, a display, a sound output device comprising sound output circuitry, and a processor electrically connected to the communication module, the display, and the sound output device. The electronic device may further include a memory electrically connected to the processor. The memory stores instructions which, when executed by the processor, cause the electronic device to control the communication module to transmit and/or receive a plurality of pieces of wireless access in vehicular environment (WAVE) information, to identify a plurality of events based on the plurality of pieces of WAVE information, to generate a plurality of messages related to the plurality of events, to determine priorities of the plurality of messages based on status information of the electronic device, and to output the plurality of messages based on the determined priorities through at least one of the display and the sound output device.

According to various embodiments of the present disclosure, the electronic device may process messages in the order of their priorities and thereby quickly offer more meaningful information to a user.

According to various embodiments of the present disclosure, when an event having a higher priority is detected while messages are output, the electronic device may process first a message related to the detected event and thereby promptly offer more important information to a user.

According to various embodiments of the present disclosure, the electronic device may vary a message display type depending on priority, thereby allowing a user to quickly grasp an importance of a message.

According to various embodiments of the present disclosure, the electronic device may not only display a message, but also output the message by a voice, thereby effectively notifying the message to a user.

According to various embodiments of the present disclosure, where an impact is detected, the electronic device may promptly process information on an urgent situation by requesting emergency message processing from a user.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 3 is a diagram illustrating a process of processing a message according to various embodiments;

FIG. 7 is a flowchart illustrating operations of processing a message according to various embodiments;

DETAILED DESCRIPTION

Figure 1:
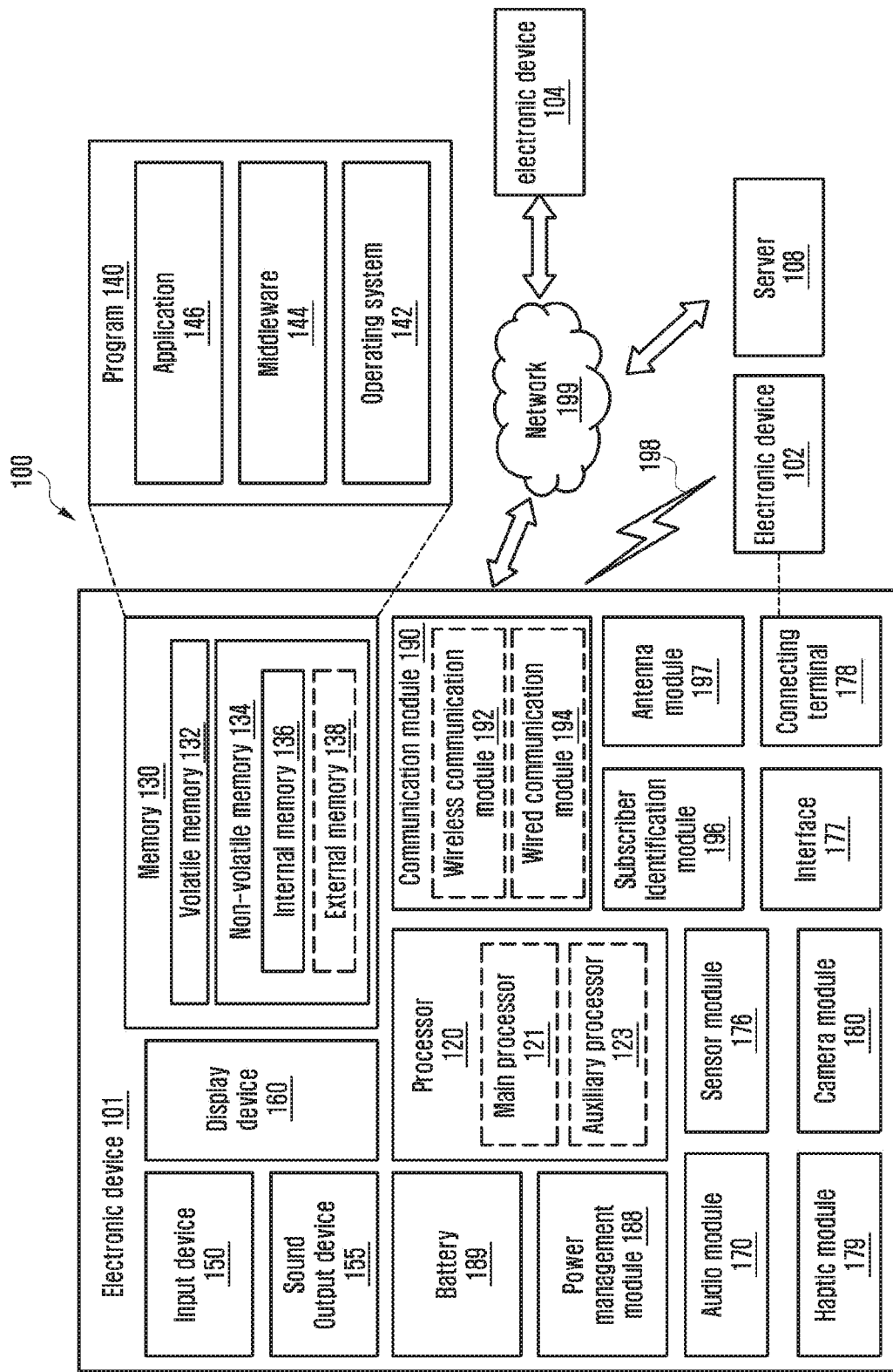
FIG. 1 is a block diagram illustrating an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), and/or an electronic device 104 and/or a server 108 via a second network 199 (e.g., a long-range wireless communication network). According to an embodiment, the electronic device 101 may communicate with the electronic device 104 via the server 108. According to an embodiment, the electronic device 101 may include a processor (e.g., including processing circuitry) 120, memory 130, an input device (e.g., including input circuitry) 150, a sound output device (e.g., including sound output circuitry) 155, a display device 160, an audio module (e.g., including audio circuitry) 170, a sensor module 176, an interface (e.g., including interface circuitry) 177, a haptic module (e.g., including haptic circuitry) 179, a camera module 180, a power management module 188, a battery 189, a communication module (e.g., including communication circuitry) 190, a subscriber identification module (SIM) 196, and/or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may include various processing circuitry and execute, for example, software (e.g., a program 140) to control at least one other component (e.g., a hardware or software component) of the electronic device 101 coupled with the processor 120, and may perform various data processing or computation. According to an example embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include, for example, and without limitation, a main processor 121 (e.g., a central processing unit (CPU) and/or an application processor (AP), or the like), and an auxiliary processor 123 (e.g., a graphics processing unit (GPU), an image signal processor (ISP), a sensor hub processor, and/or a communication processor (CP), or the like) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 and/or the sensor module 176) of the electronic device 101. The various data may include, for example, software (e.g., the program 140) and input data and/or output data for a command related thererto. The memory 130 may include the volatile memory 132 or the non-volatile memory 134.

The program 140 may be stored in the memory 130 as software, and may include, for example, and without limitation, an operating system (OS) 142, middleware 144, and/or an application 146, or the like.

The input device 150 may receive a command or data to be used by other component (e.g., the processor 120) of the electronic device 101, from the outside (e.g., a user) of the electronic device 101. The input device 150 may include various input circuitry, such as, for example, and without limitation, a microphone, a mouse, and/or a keyboard, or the like.

The sound output device 155 may include various sound output circuitry and output sound signals to the outside of the electronic device 101. The sound output device 155 may include various sound output circuitry, such as, for example, and without limitation, a speaker and/or a receiver, or the like. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, and without limitation, a display, a hologram device, and/or a projector, or the like and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may include various audio circuitry and convert a sound into an electrical signal and vice versa. According to an embodiment, the audio module 170 may obtain the sound via the input device 150, and/or output the sound via the sound output device 155 and/or a headphone of an external electronic device (e.g., an electronic device 102) directly (e.g., by wire) or wirelessly coupled with the electronic device 101.

The sensor module 176 may detect an operational state (e.g., power or temperature) of the electronic device 101 and/or an environmental state (e.g., a state of a user) external to the electronic device 101, and generate an electrical signal and/or data value corresponding to the detected state. According to an embodiment, the sensor module 176 may include, for example, and without limitation, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, and/or an illuminance sensor, or the like.

The interface 177 may support one or more specified protocols to be used for the electronic device 101 to be coupled with the external electronic device (e.g., the electronic device 102) directly (e.g., by wire) or wirelessly. According to an embodiment, the interface 177 may include various interface circuitry, such as, for example, and without limitation, a high definition multimedia interface (HDMI), a universal serial bus (USB) interface, a secure digital (SD) card interface, and/or an audio interface, or the like.

A connecting terminal 178 may include a connector via which the electronic device 101 may be physically connected with the external electronic device (e.g., the electronic device 102). According to an embodiment, the connecting terminal 178 may include, for example, and without limitation, an HDMI connector, a USB connector, a SD card connector, and/or an audio connector (e.g., a headphone connector), or the like.

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include various haptic circuitry, such as, for example, and without limitation, a motor, a piezoelectric element, and/or an electric stimulator, or the like.

The camera module 180 may capture a still image or moving images. According to an embodiment, the camera module 180 may include one or more lenses, image sensors, image signal processors, or flashes.

The power management module 188 may manage power supplied to the electronic device 101. According to an example embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may include various communication circuitry and support establishing a direct (e.g., wired) communication channel or a wireless communication channel between the electronic device 101 and the external electronic device (e.g., the electronic device 102, the electronic device 104, and/or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, and/or infrared data association (IrDA)) and/or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted and/or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, and without limitation, a portable communication device (e.g., a smart phone), a computer device, a portable multimedia device, a portable medical device, a camera, a wearable device, and/or a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and do not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., via wire), wirelessly, or via a third element.

As used herein, the term "module" may include a unit implemented in hardware, software, or firmware, and/or any combinations thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium.

According to an embodiment, a method of operating an electronic device according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Hereinafter, message processing methods according to various embodiments of the present disclosure will be described in detail with reference to FIGS. 2A to 12.

Figure 2A:
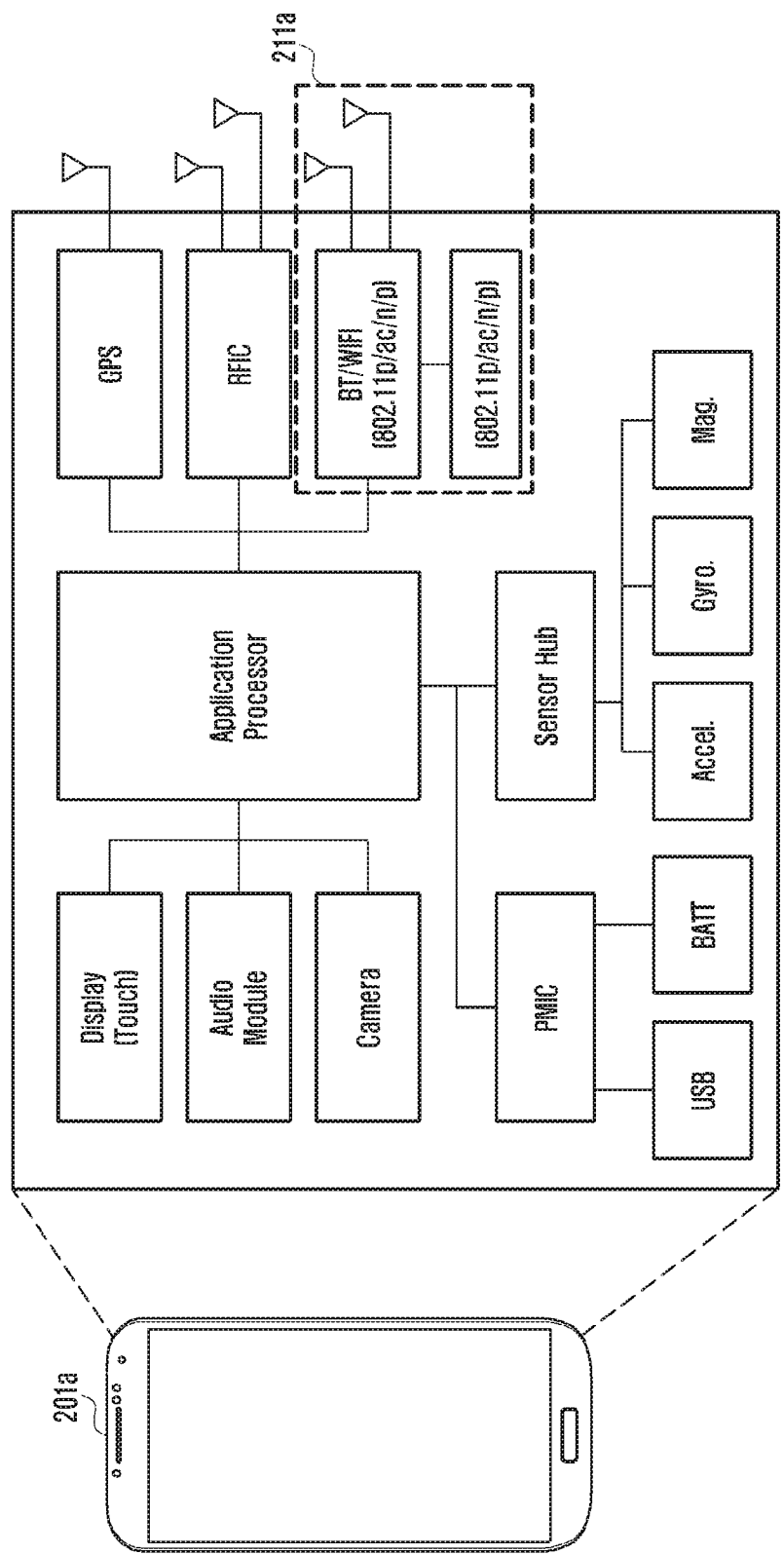
FIGS. 2A, 2B and 2C are block diagrams illustrating a hardware configuration of an electronic device according to various embodiments.
Figure 2B:
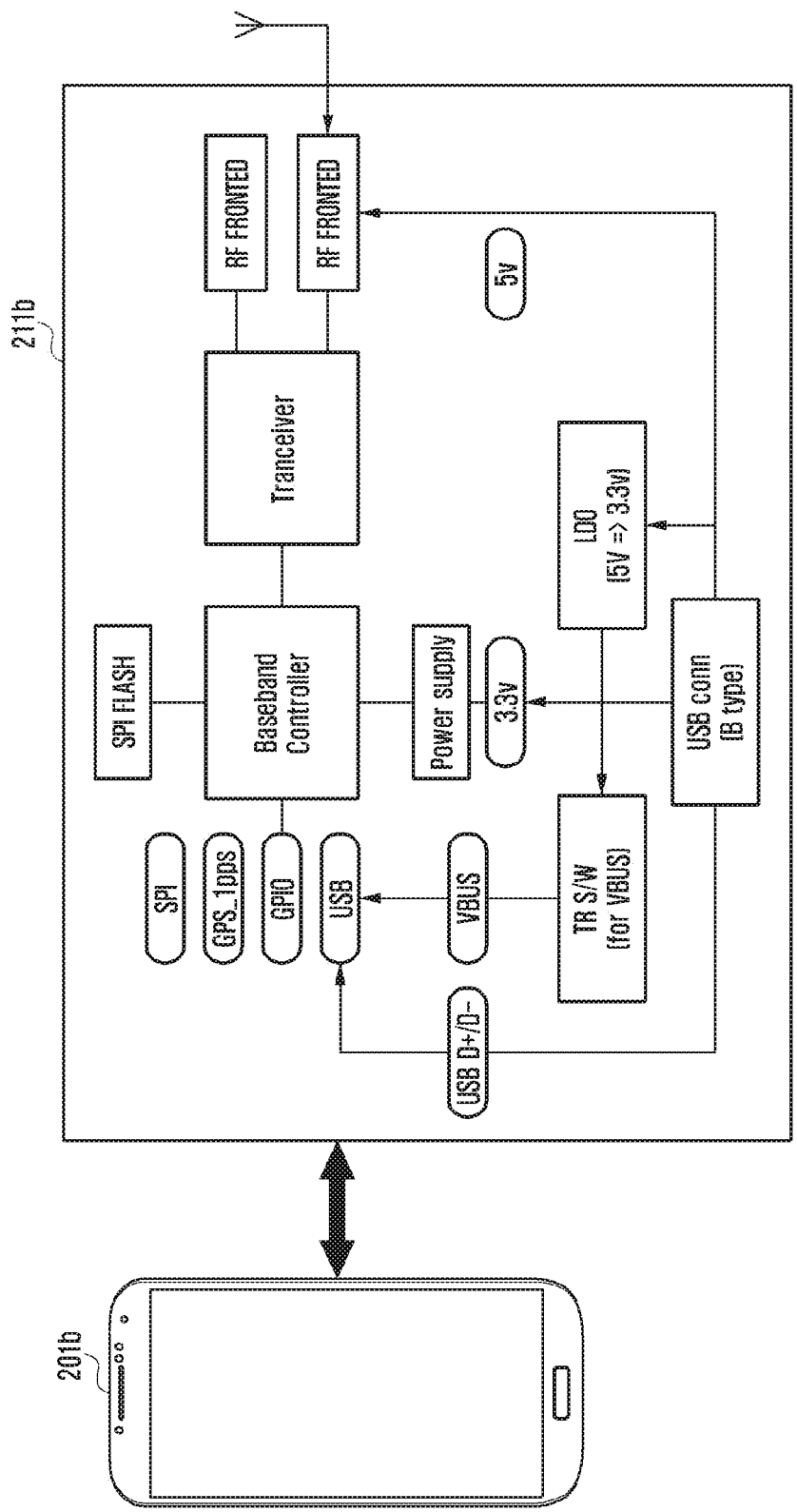
Figure 2C:
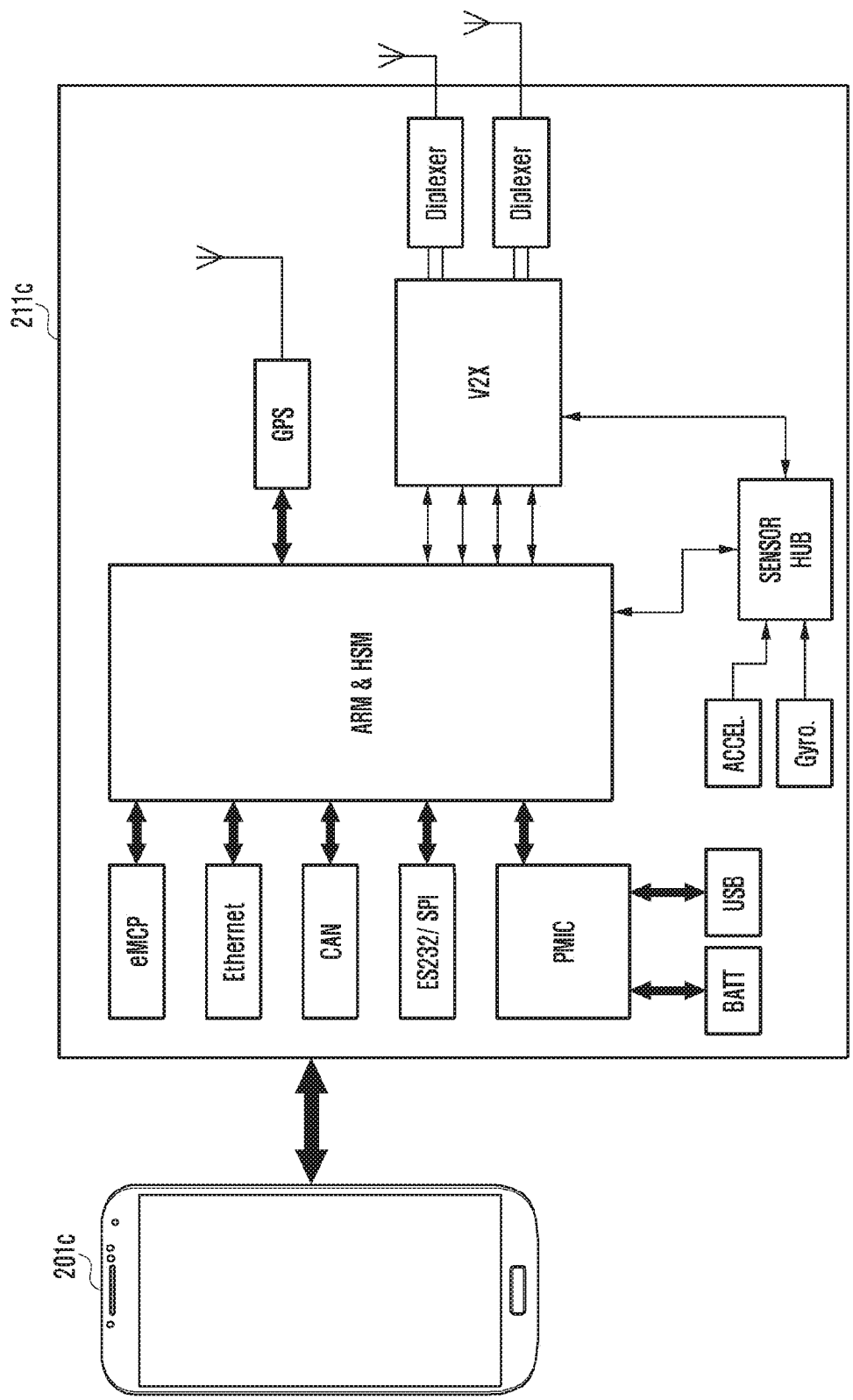

FIGS. 2A, 2B and 2C are block diagrams illustrating a hardware configuration of an electronic device according to various embodiments.

According to various embodiments, the electronic device may include a wireless communication system having high speed, narrow range, and low delay characteristics in a vehicle environment with active mobility. For this purpose, the electronic device complies with the Wireless Access in Vehicular Environment (WAVE) communication standard, which may include IEEE 802.11p and IEEE 1609 standards.

As illustrated in FIG. 2A, an electronic device 201a (e.g., the electronic device 101 in FIG. 1) may include a WAVE module capable of supporting the WAVE communication according to various embodiments. As an example, BT/WIFI (802.11p/ac/n/p) and security chip of the electronic device 201a may correspond to the WAVE module 211a.

As illustrated in FIG. 2B, an electronic device 201b (e.g., the electronic device 101 in FIG. 1) may perform the WAVE communication through communication with an external electronic device that supports a WAVE module. A reference numeral 211b in FIG. 2B indicates a dongle-type WAVE module that does not include a micro controller unit (MCU) corresponding to a central processing unit (CPU). The dongle-type WAVE module 211b may include a baseband controller, a transceiver, and the like. The baseband controller may perform a function of controlling a frequency band obtained by all signals used to modulate a particular carrier wave.

As illustrated in FIG. 2C, an electronic device 201c (e.g., the electronic device 101 in FIG. 1) may perform the WAVE communication through communication with an external electronic device that supports a WAVE module. A reference numeral 211c in FIG. 2C indicates the external electronic device that includes the MCU corresponding to the CPU. The external electronic device 211c including the WAVE module may include an ARM controller corresponding to the CPU, a V2X module controlled by the ARM controller and capable of communication based on the WAVE communication standard, and a diplexer connected to the V2X module. The external electronic device 211c including the WAVE module may further include a PMIC for controlling a battery and a USB, at least one sensor, and the like.

FIG. 3 is a diagram illustrating a process of processing a message according to various embodiments.

The electronic device may transmit and receive at least one piece of information through WAVE communication to and from other electronic device, an infrastructure, or an external server. The at least one piece of information may include, for example, and without limitation, information about latitude, longitude, elevation, a vehicle transmission state, a positional accuracy for each axis, a speed, a steering wheel angle, a brake system status, a vehicle size (length and width), or the like. The electronic device may process such information as status information of the electronic device. In a certain embodiment, based on information about latitude, longitude, and vehicle size of one electronic device corresponding to one vehicle and information about latitude, longitude, and vehicle size received from another electronic device corresponding to another vehicle, it is possible to know whether two vehicles collide with each other.

The electronic device may identify at least one event from the at least one piece of information transmitted and received. For example, the at least one event may include a collision between the two vehicles as mentioned above.

According to various embodiments, the electronic device may classify the identified events into a plurality of cases. For example, the events may be classified into a first accident notification event for notifying an accident of a vehicle wirelessly connected to the electronic device to neighboring vehicles, a collision notification event for indicating a collision with a pedestrian and/or a vehicle, a second accident notification event for indicating an accident of another vehicle, an emergency notification event regarding an emergency vehicle such as a fire truck and/or an ambulance, a traffic jam notification event, and/or an underprivileged notification event (optional). The underprivileged notification event may, for example, and without limitation, be an event for indicating that a driver or a passenger is a pregnant woman, a novice driver, a disabled person, an elderly driver, or the like. Such events may have priorities. In addition, such events may be processed into messages in the order of priorities, and then the messages may be displayed on a display of the electronic device or transmitted to another electronic device to be displayed.

In an example embodiment, the electronic device may consider the first accident notification event as having a first priority.

According to various embodiments, the electronic device may generate an event-related message to notify the identified events to the user thereof and also deliver the generated message to users of other electronic devices.

In FIG. 3, reference numeral 300 illustrates an example in which the electronic device generates messages 301, 302, 303, 304 and 305 related to events which are identified based on information transmitted and/or received. The generated messages 301, 302, 303, 304 and 305 may be arranged in the order of time of occurrence. Reference numeral 350 indicates that the electronic device processes the messages 301, 302, 303, 304 and 305 through a specific algorithm. For example, the messages 301, 302, 303, 304 and 305 may be rearranged in the order of priorities, selectively integrated, and/or selectively deleted.

In an example embodiment, the electronic device may check the duplication or relevancy of the identified events and, if there are duplicate or relevant events, process them into a single message. By way of non-limiting example, a first pedestrian detection message 301 and a second pedestrian detection message 305 may be integrated into a pedestrian detection message 351. As another non-limiting example, a traffic jam detection message 302 and a novice driver detection message 304 may be integrated into a traffic jam or novice driver detection message 352. Through such integration of messages, the electronic device may output a simpler message such that the user can more easily and quickly check important or meaningful information.

In another embodiment, when processing the identified events into messages, the electronic device may perform such processing based on newly received information.

As one example, when a change in the status information of the electronic device is detected as newly received information, the electronic device may decide not to output a message. For example, if an accident vehicle detection message 303 is output and then a related event such as information indicating a change in driving direction is received, the electronic device may delete an accident vehicle detection message 313 to be output subsequently.

As another example, when information related to external electronic devices is received as newly received information, the electronic device may decide not to output a message. For example, if the accident vehicle detection message 303 is output and then a related event such as information indicating the completion of towing an accident vehicle is received, the electronic device may delete the accident vehicle detection message 313 to be output subsequently.

In still another embodiment, the electronic device may output messages related to the identified events according to the priorities of the events.

As described hereinbefore, the electronic device may identify events, based on information transmitted or received in real time, and generate messages related to the identified events, and process the generated messages, based on at least one of priorities of the identified events, status information of the electronic device, and information related to external electronic devices.

Figure 4:
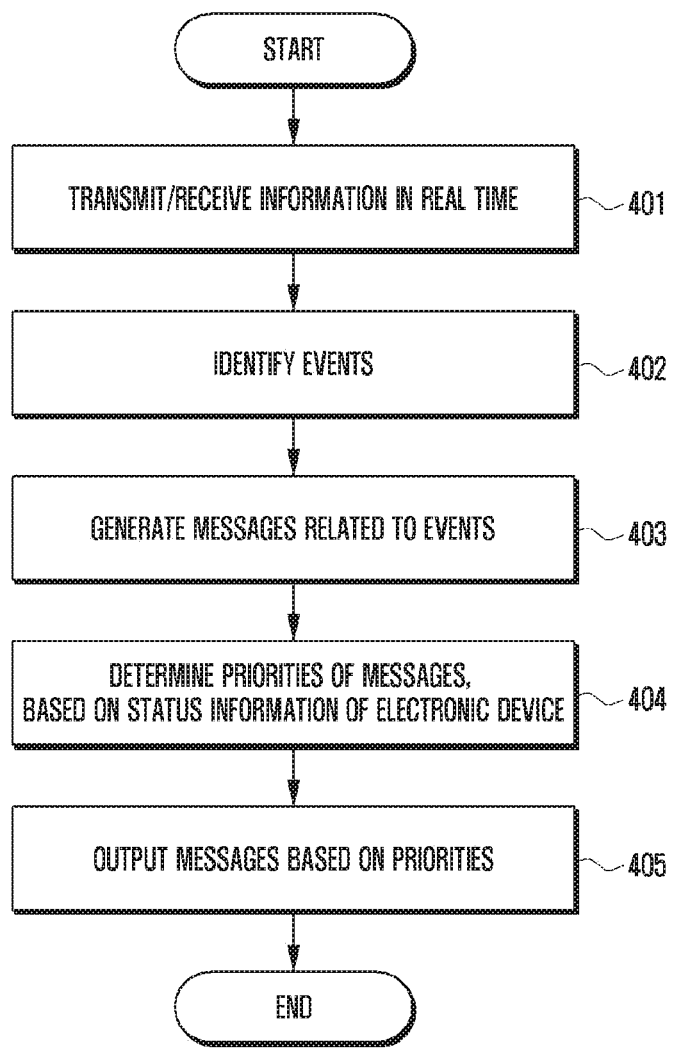
FIG. 4 is a flowchart illustrating operations of processing a message according to various embodiments.

FIG. 4 is a flowchart illustrating operations of processing a message according to various embodiments.

Referring to FIG. 4, at operation 401, a processor (e.g., the processor 120 in FIG. 1) of an electronic device (e.g., the electronic device 101 in FIG. 1) may transmit and/or receive a plurality of pieces of information in real time. At operation 402, the processor may identify a plurality of events, based on the transmitted and/or received information.

At operation 403, the processor may generate a plurality of messages related to the identified events.

At operation 404, the processor may determine the priorities of the generated messages, based on status information of the electronic device. At operation 405, the processor may output the generated messages based on the determined priorities.

In an example embodiment, if it is determined, based on the status information of the electronic device, there is a need to output a new message having a higher priority than a currently output message, the electronic device may output the new message instead of the currently output message. This will be described in greater detail below with reference to FIGS. 5A to 6B.

Figure 5A:
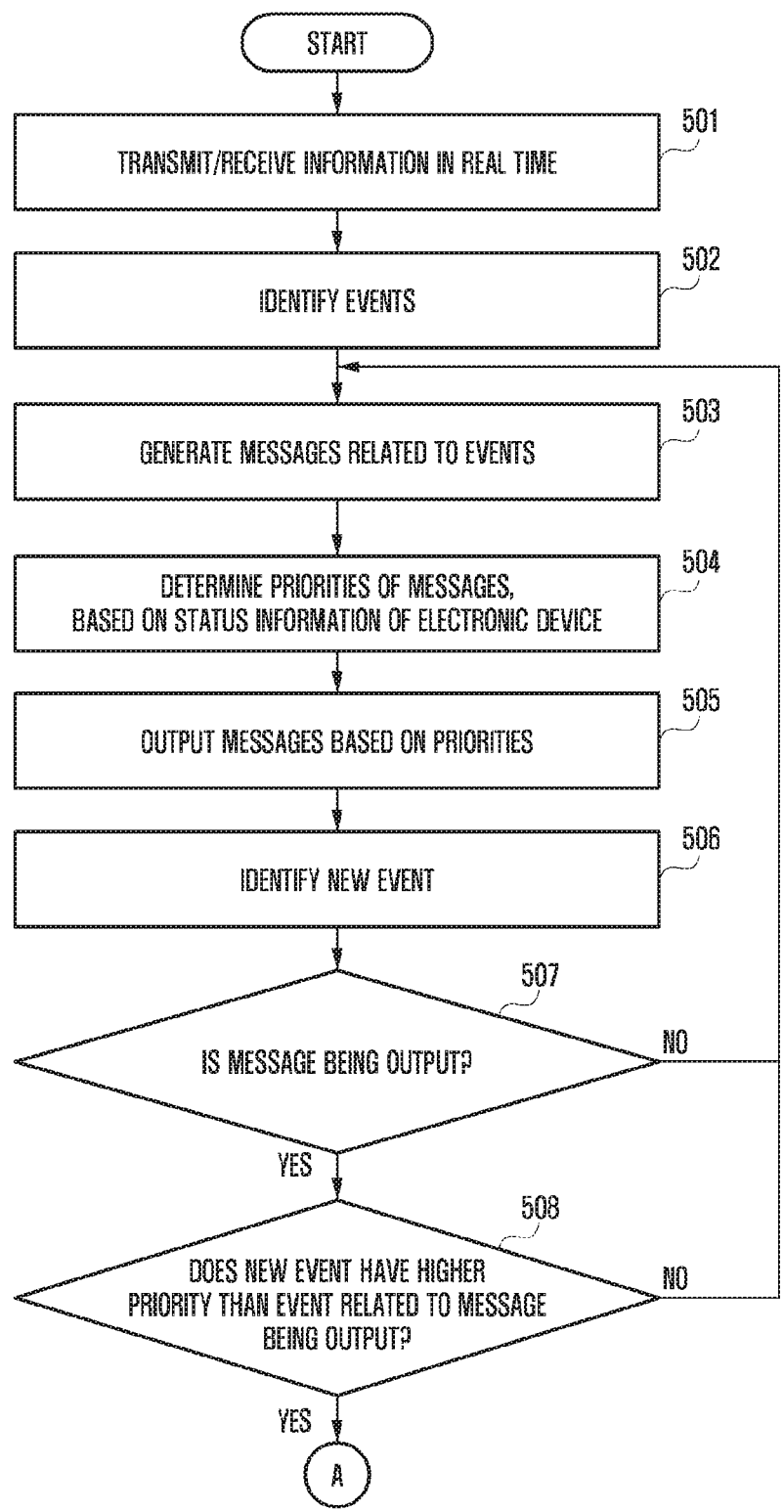
FIGS. 5A and 5B are flowcharts illustrating operations of processing a message according to various embodiments.
Figure 5B:
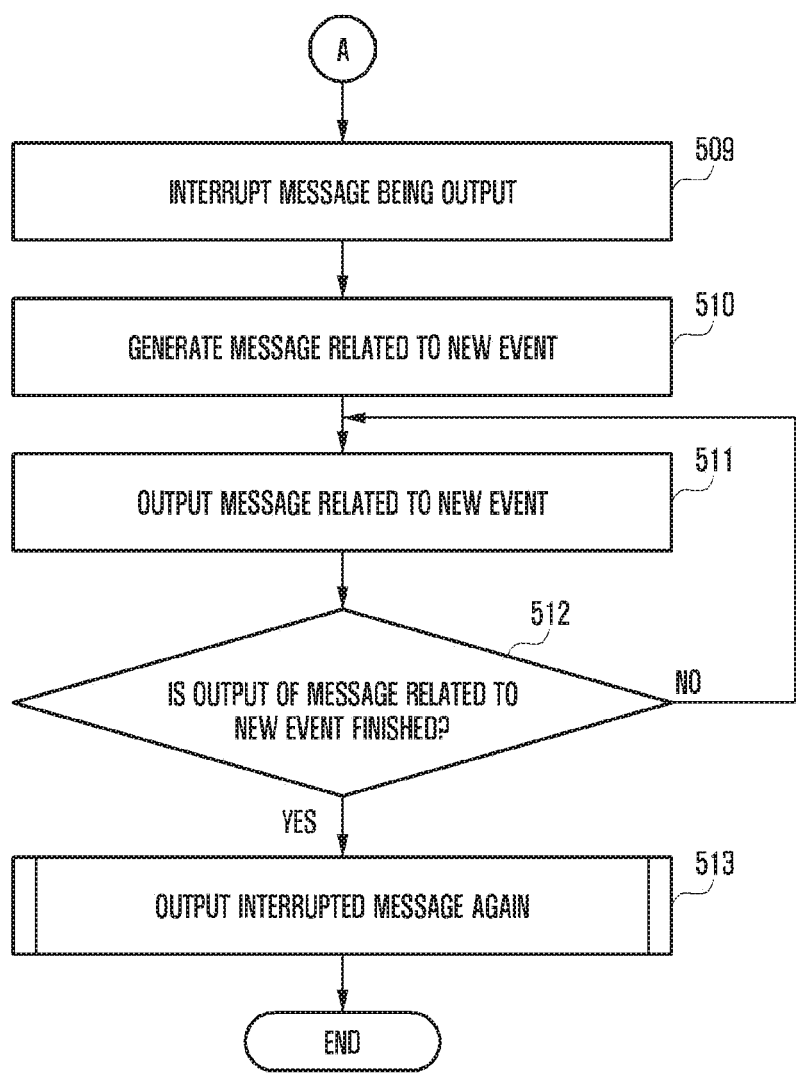
Figure 5C:
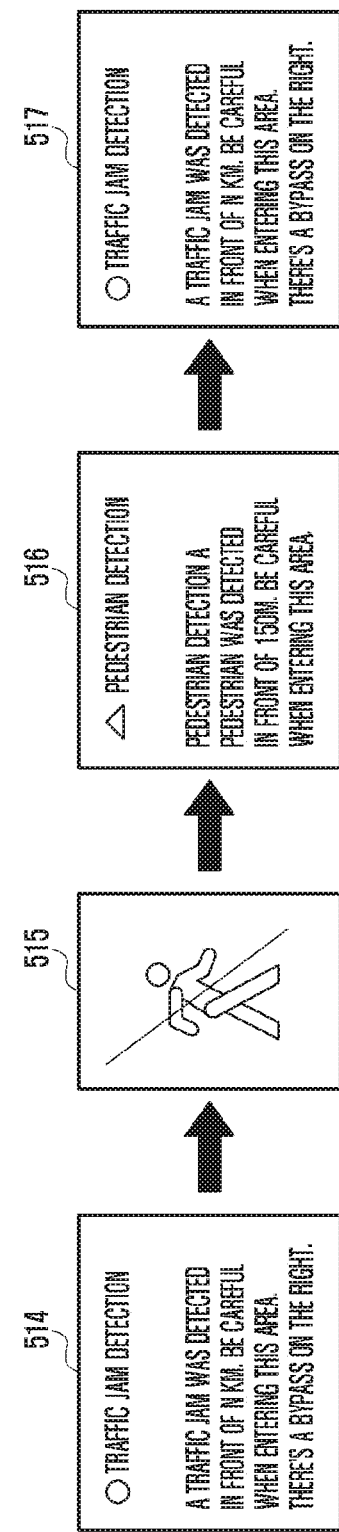
FIG. 5C is a diagram illustrating a process of processing a message according to various embodiments.

FIGS. 5A and 5B are flowcharts illustrating operations of processing a message according to various embodiments. FIG. 5C is a diagram illustrating a process of processing a message according to various embodiments.

Referring to FIG. 5A, at operation 501, a processor (e.g., the processor 120 in FIG. 1) of an electronic device (e.g., the electronic device 101 in FIG. 1) may transmit and/or receive a plurality of pieces of information in real time. At operation 502, the processor may identify a plurality of events, based on the transmitted or received information.

At operation 503, the processor may generate a plurality of messages related to the identified events.

At operation 504, the processor may determine the priorities of the generated messages, based on status information of the electronic device.

At operation 505, the processor may output the generated messages based on the determined priorities. At this time, the messages may be displayed in the form of, e.g., a pop-up message on a display (e.g., the display 160 in FIG. 1) of the electronic device and/or be output in the form of voice through a sound output device (e.g., the sound output device 155 in FIG. 1) of the electronic device. The sound output action of messages may be made together with, or before, or after the display action of messages. This operation 505 will be described in greater detail below. For example, as indicated by a reference numeral 514 in FIG. 5C, the electronic device may output a message for indicating the occurrence of a traffic jam.

When new information is received as the status of the electronic device is changed, the processor may identify a new event based on the received new information at operation 506. For example, as indicated by a reference numeral 515 in FIG. 5C, the electronic device may detect the presence of a pedestrian, based on information indicating the presence of a pedestrian near the electronic device, while outputting the above message for indicating the occurrence of a traffic jam.

At operation 507, the processor may determine whether there is a message being output.

If it is determined at operation 507 that there is no message being output, the processor may return to the above-described operation 503 to generate a message related to the newly identified event. Then, the processor output the generated message according to the priority of the event.

If it is determined at operation 507 that there is a message being output, the processor may determine at operation 508 whether the new event has a higher priority than an event related to the message being output.

If it is determined at operation 508 that the new event has a lower priority than an event related to the message being output, the processor may return to the above-described operation 503 to generate a message related to the newly identified event. Then, the processor output the generated message according to the priority of the event.

If it is determined at operation 508 that the new event has a higher priority than an event related to the message being output, the processor may perform operation 509 in FIG. 5B.

At operation 509, the processor may interrupt the message being currently output. For example, in FIG. 5C, the processor may stop displaying the message related to a traffic jam detection event and/or stop outputting the message by voice.

The processor may generate a message related to the newly identified event at operation 510 and output the generated message at operation 511. For example, as indicated by a reference numeral 516 in FIG. 5C, the electronic device may output a message related to the pedestrian detection event. That is, the message related to the pedestrian detection event may be displayed in the form of, e.g., a pop-up message on the display of the electronic device and/or be output in the form of voice through the sound output device of the electronic device.

At operation 512, the processor may determine whether the output of the message related to the new event is finished.

If it is determined at operation 512 that the output of the message related to the new event is not finished, the processor may return to the above-described operation 511.

If it is determined at operation 512 that the output of the message related to the new event is finished, the processor may perform operation 513.

At operation 513, the processor may output the previous interrupted message again because of the output of the current message related to the new event. For example, as indicated by a reference numeral 517 in FIG. 5C, the message related to the traffic jam detection event, which has been interrupted previously, may be output again when the output of the message related to the pedestrian detection event as a new event is finished.

Hereinafter, operations of processing a message will be described with reference to FIGS. 6A and 6B.

Figure 6A:
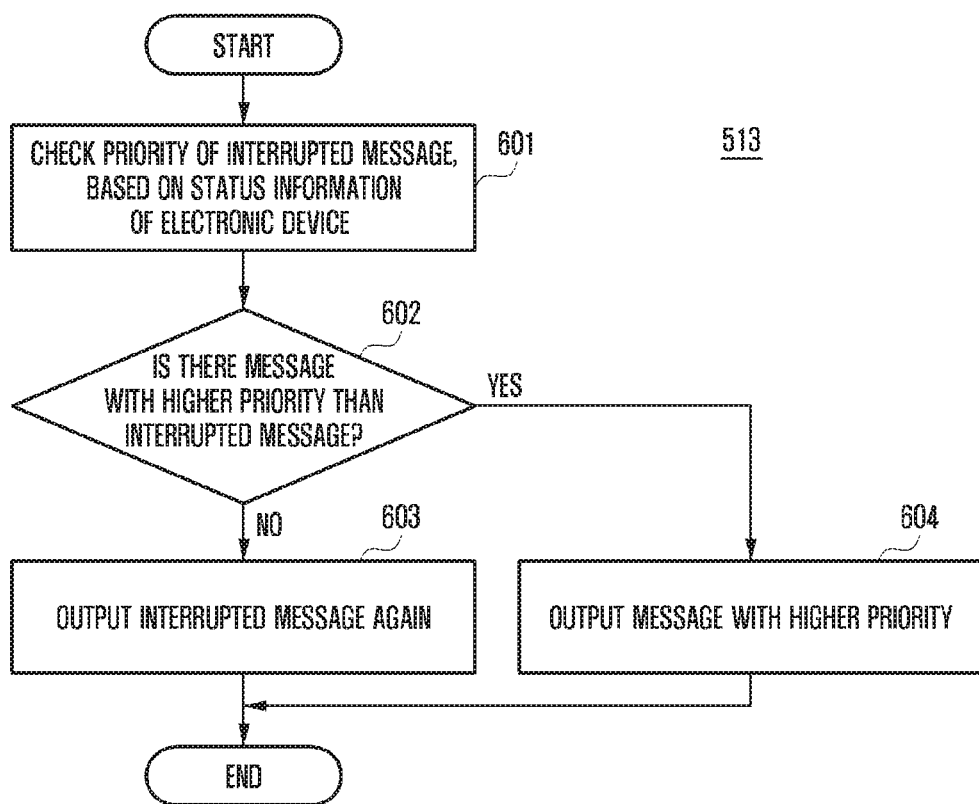
FIGS. 6A and 6B are flowcharts illustrating operations of processing a message according to various embodiments.

FIG. 6A is a flowchart illustrating operations of processing a message according to various embodiments. Specifically, FIG. 6A illustrates detailed operations of the above-described operation 513 of FIG. 5B.

At operation 601, the processor may check the priority of the interrupted message, based on the status information of the electronic device. At operation 602, the processor may determine whether there is a message having a higher priority than that of the interrupted message. If it is determined at operation 602 that there is no message having a higher priority than that of the interrupted message, the processor may output the interrupted message again at operation 603.

If it is determined at operation 602 that there is a message having a higher priority than that of the interrupted message, the processor may output the message having a higher priority.

Figure 6B:
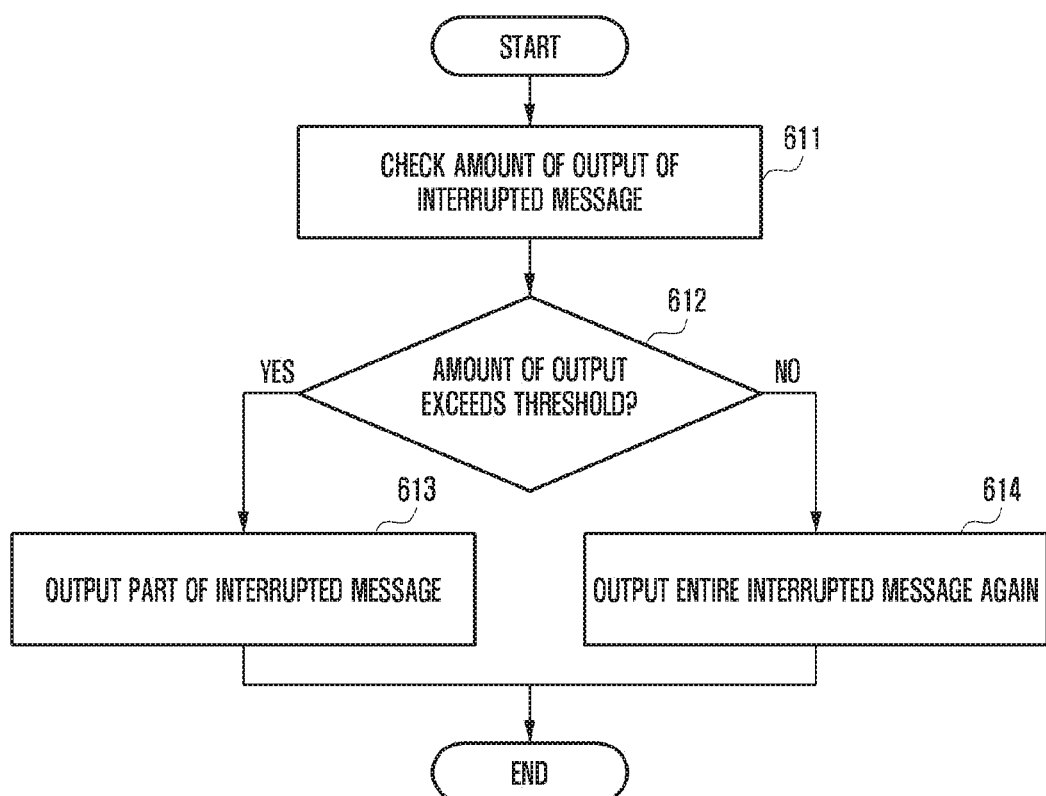

FIG. 6B is a flowchart illustrating operations of processing a message according to various embodiments. Specifically, FIG. 6B illustrates detailed operations of the above-described operation 603 of FIG. 6A.

At operation 611, the processor may check the amount of output of the interrupted message. For example, the processor may determine whether a voice output of a message related to a traffic jam detection event corresponds to only a message title or more than half of message contents.

At operation 612, the processor may determine whether the amount of output of the interrupted message exceeds a predetermined threshold. If it is determined at operation 612 that the amount of output of the interrupted message exceeds the predetermined threshold, the processor may perform operation 613.

At operation 613, the processor may output a part of the interrupted message. For example, the processor may output only the message title or output a non-output part of the message again.

If it is determined at operation 612 that the amount of output of the interrupted message does not exceed the predetermined threshold, the processor may perform operation 614.

At operation 614, the processor may output the entire contents of the interrupted message again.

Meanwhile, according to various embodiments, when an impact is detected while event-related messages are output according to priorities, the electronic device may request a user input and, if any user input is not received within a predetermined time, process an emergency message. Hereinafter, details will be described with reference to FIGS. 7, 8A, and 8B.

Figure 8A:
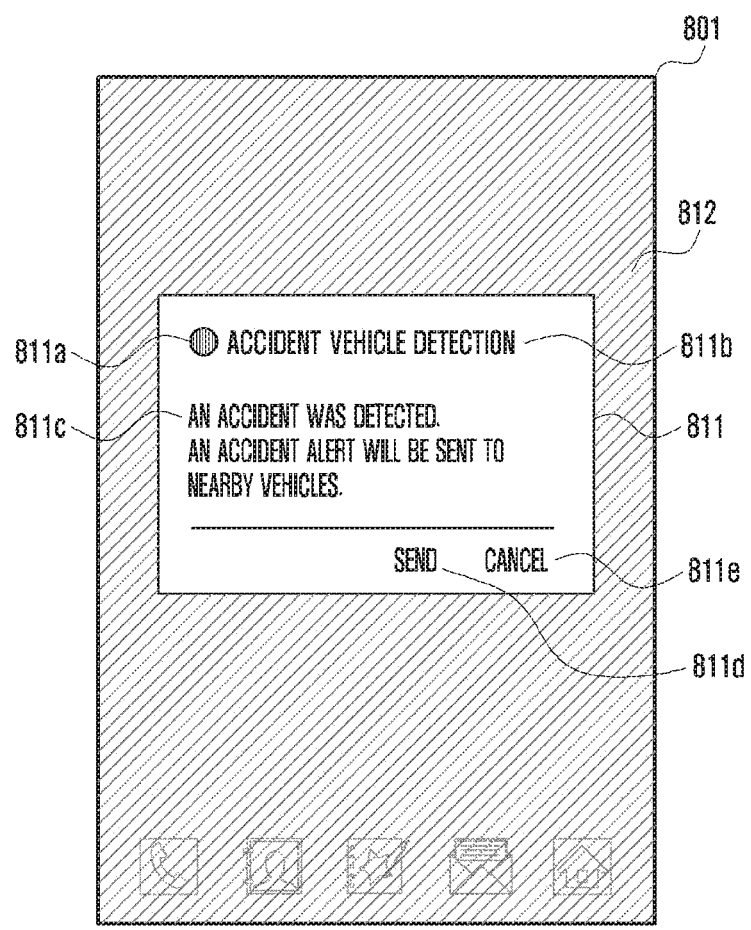
FIGS. 8A and 8B are diagrams illustrating a process of processing a message according to various embodiments.
Figure 8B:
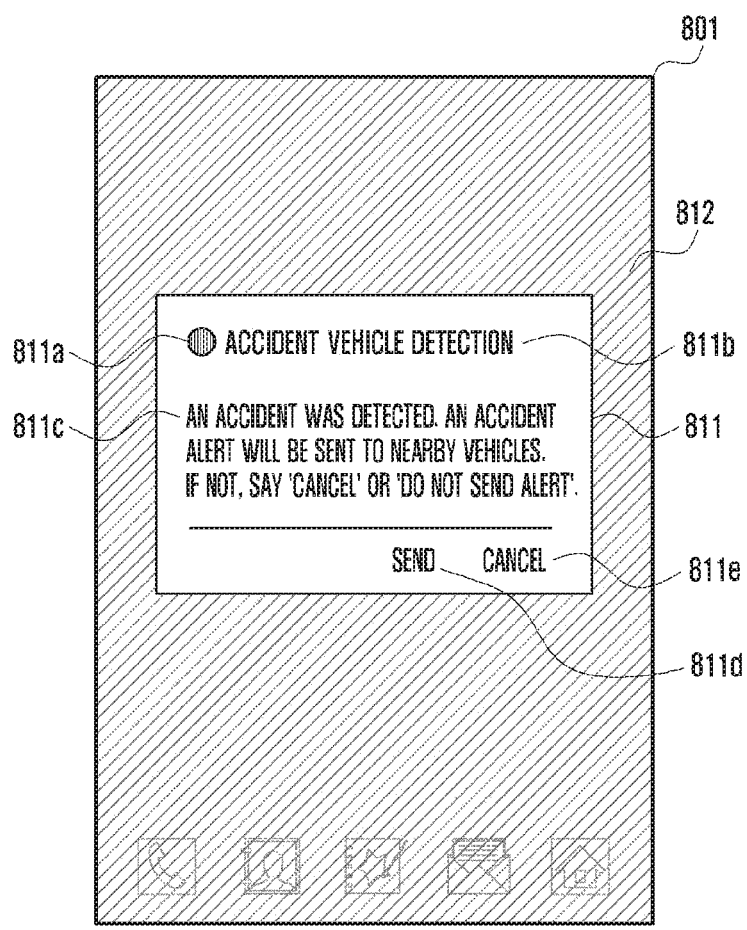

FIG. 7 is a flowchart illustrating operations of processing a message according to various embodiments. FIGS. 8A and 8B are diagrams illustrating a process of processing a message according to various embodiments.

Referring to FIG. 7, at operation 700, a processor (e.g., the processor 120 in FIG. 1) of an electronic device (e.g., the electronic device 101 in FIG. 1) may transmit and/or receive a plurality of pieces of information in real time. For example, the plurality of pieces of information may include WAVE information. At operation 701, the processor may identify a plurality of events, based on the transmitted or received information. At operation 702, the processor may generate a plurality of messages related to the identified events. At operation 703, the processor may determine the priorities of the generated messages, based on status information of the electronic device. At operation 704, the processor may output the generated messages based on the determined priorities.

At operation 705, the processor may determine whether an impact is detected. If it is determined at operation 705 that there is no detected impact, the processor may return to the above-described operation 704.

If it is determined at operation 705 that there is a detected impact, the processor may perform operation 706. For example, when impact detection data is received from a sensor (e.g., the sensor module 176 in FIG. 1) of the electronic device, the processor may determine that there is a detected impact.

At operation 706, the processor may display a user interface for requesting a user input.

At operation 707, the processor may determine whether there is a specific user input received through the user interface.

If it is determined at operation 707 that the specific user input is received through the user interface, the processor may return to the above-described operation 704 to output the generated messages according to the priorities without consideration of the detected impact.

If it is determined at operation 707 that the specific user input is not received through the user interface, the processor may process an emergency message at operation 708.

Referring to FIG. 8A, an electronic device 801 may display a user interface 811 on a display 812. The user interface 811 may contain an emergency message, which may include a message icon 811a, a message title 811b, and message contents 811c. For example, the message contents 811c may be as follows: "An accident was detected. An accident alert will be sent to nearby vehicles." The emergency message may also include at least one button or icon for processing the message, such as a send button 811d and a cancel button 811e. Further, although not shown, the electronic device 801 may output the emergency message by voice to the user.

As one example, when a user input of touching the cancel button 811e is received through the user interface 811, the electronic device 801 may output previously generated messages according to their priorities without processing the emergency message, e.g., without considering of a detected impact. For example, when a vehicle connected to the electronic device 801 passes a speed bump, an impact may be detected. In this case, the user of the electronic device 801 may touch the cancel button 811e on the user interface 811 displayed on the display 812 such that the electronic device 801 can recognize this case as a non-accident.

As another example, when no user input is received through the user interface 811 for a certain time, the electronic device 801 may send the emergency message to external electronic devices. In addition, when a user input of touching the send button 811d is received through the user interface 811, the electronic device 801 may immediately send the emergency message to the external electronic devices. For example, when a vehicle connected to the electronic device 801 collides with another vehicle, the electronic device 801 may detect an impact. In this case, if any user input is not received through the user interface 811 for a certain time, the electronic device 801 may determine the user to be unconscious due to the collision and thus send the emergency message to the external electronic devices.

Referring to FIG. 8B, the electronic device 801 may display the user interface 811 on the display 812. The user interface 811 may contain an emergency message including the message icon 811a, the message title 811b, and the message contents 811c. For example, the message contents 811c may be as follows: "An accident was detected. An accident alert will be sent to nearby vehicles. If not, please say 'cancel' or 'do not send alert'." The emergency message may also include at least one button or icon for processing the message, such as the send button 811d and the cancel button 811e. Further, although not shown, the electronic device 801 may output the emergency message by voice to the user.

When a specific voice input such as 'cancel' or 'do not send alert' is received through the user interface 811, the electronic device 801 may output previously generated messages according to their priorities without processing the emergency message, e.g., without considering of a detected impact. For example, when a vehicle connected to the electronic device 801 passes a speed bump, an impact may be detected. In this case, the user of the electronic device 801 may enter a voice input such as 'cancel' or 'do not send alert' such that the electronic device 801 can recognize this case as a non-accident.

FIGS. 9, 10, 11, 12A, 12B and 12C show various examples of messages displayed on an electronic device according to various embodiments.

Figure 9:
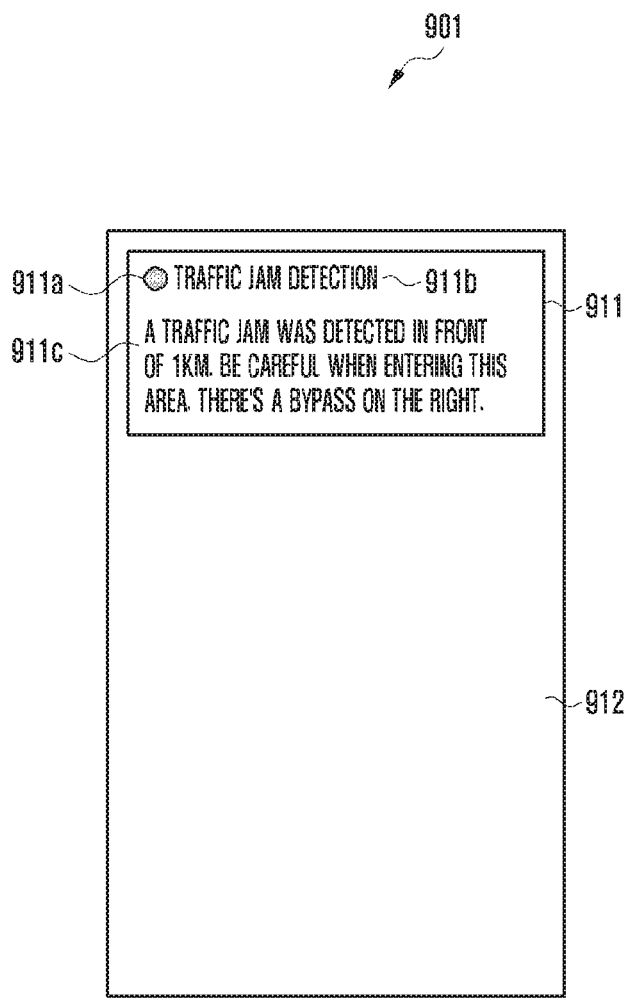
FIG. 9 is a diagram illustrating a process of processing a message according to various embodiments.

FIG. 9 is a diagram illustrating a process of processing a message according to various embodiments. Referring to FIG. 9, an electronic device 901 may display a message 911 on a display 912. The message 911 may include a message icon 911a, a message title 911b, and message contents 911c. For example, the message title 911b may be "traffic jam detection", and the message contents 911c may be as follows: "A traffic jam was detected in front of 1 km. Be careful when entering this area. There's a bypass on the right." Also, the electronic device 901 may output the message 911 by voice to the user. As one example, the electronic device 901 may output the message title 911b and the message contents 911c by voice. As another example, the electronic device 901 may display the message 911 on the display 912 for about two seconds and then output the message title 911b and the message contents 911c by voice.

Figure 10:
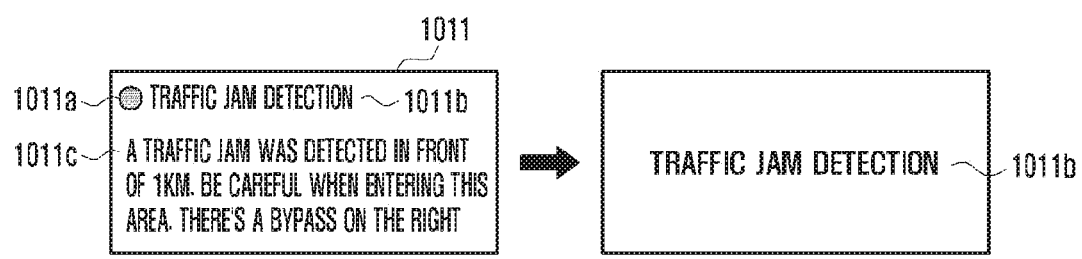
FIG. 10 is a diagram illustrating a process of processing a message according to various embodiments.

FIG. 10 is a diagram illustrating a process of processing a message according to various embodiments. Referring to FIG. 10, the electronic device may display a message 1011 on the display. The message 1011 may include a message icon 1011a, a message title 1011b, and message contents 1011c. For example, the message title 1011b may be "traffic jam detection", and the message contents 1011c may be as follows: "A traffic jam was detected in front of 1 km. Be careful when entering this area. There's a bypass on the right." Also, the electronic device may output the message 1011 by voice to the user.

When the message 1011 is related to a high priority event, the electronic device may output the message 1011 in two steps. In the first step, the electronic device may perform the display of the message and the voice output of the message at the same time. Alternatively, the electronic device may display the message for two seconds only, for example. After the message disappears, the electronic device may output the message title 1011b and the message contents 1011c by voice. In the second step, the electronic device may display only the message title 1011b or output again the message title 101b by voice with an increased volume.

Figure 11:
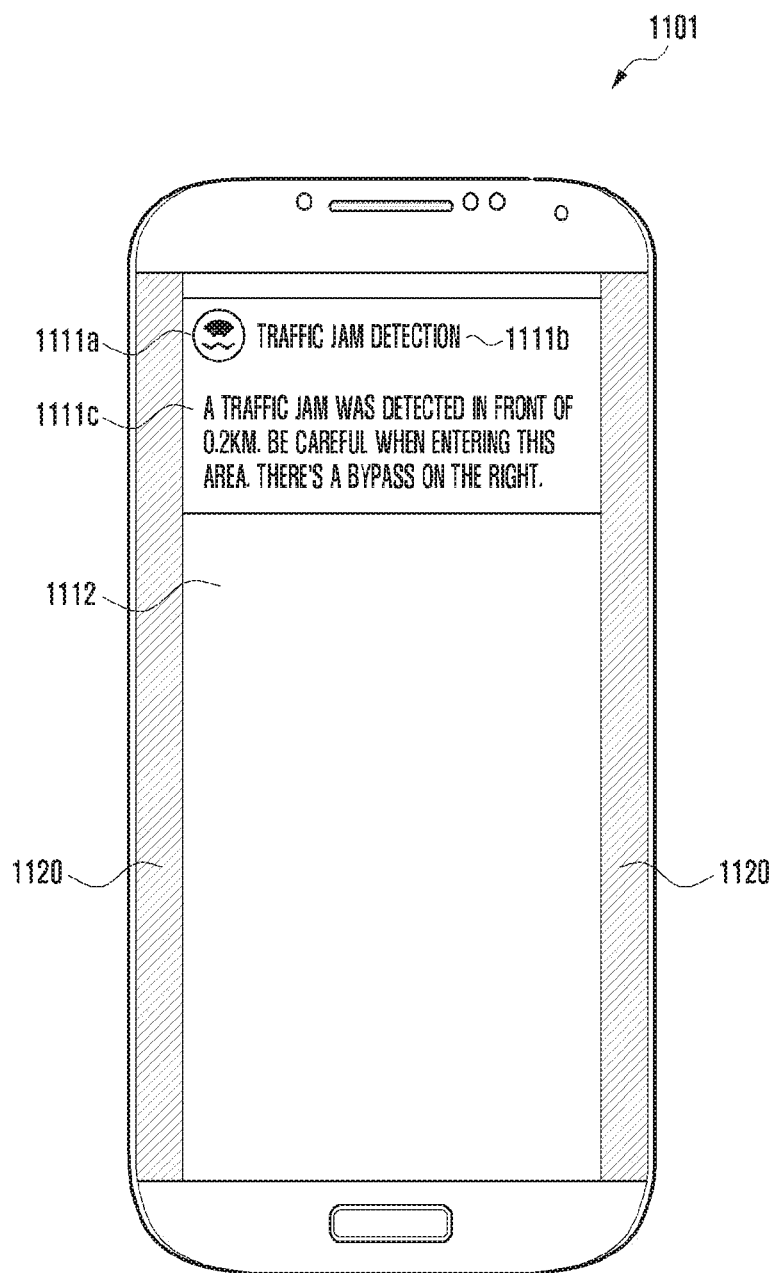
FIG. 11 is a diagram illustrating a process of processing a message according to various embodiments.

FIG. 11 is a diagram illustrating a process of processing a message according to various embodiments. Referring to FIG. 11, an electronic device 1101 may display a message on a display 1112. The message may include a message icon 1111a, a message title 1111b, and message contents 1111c. For example, the message title 1111b may be "traffic jam detection", and the message contents 1111c may be as follows: "A traffic jam was detected in front of 0.2 km. Be careful when entering this area. There's a bypass on the right." Also, the electronic device may output the message by voice to the user.

When a message is related to a high priority event, the electronic device 1101 may output the message on a portion of the display 1112 and also display a visual effect on an edge area 1120 of the display 1112. In this case, depending on priorities, the electronic device 1101 may vary the visual effect displayed on the edge area 1120.

Figure 12A:
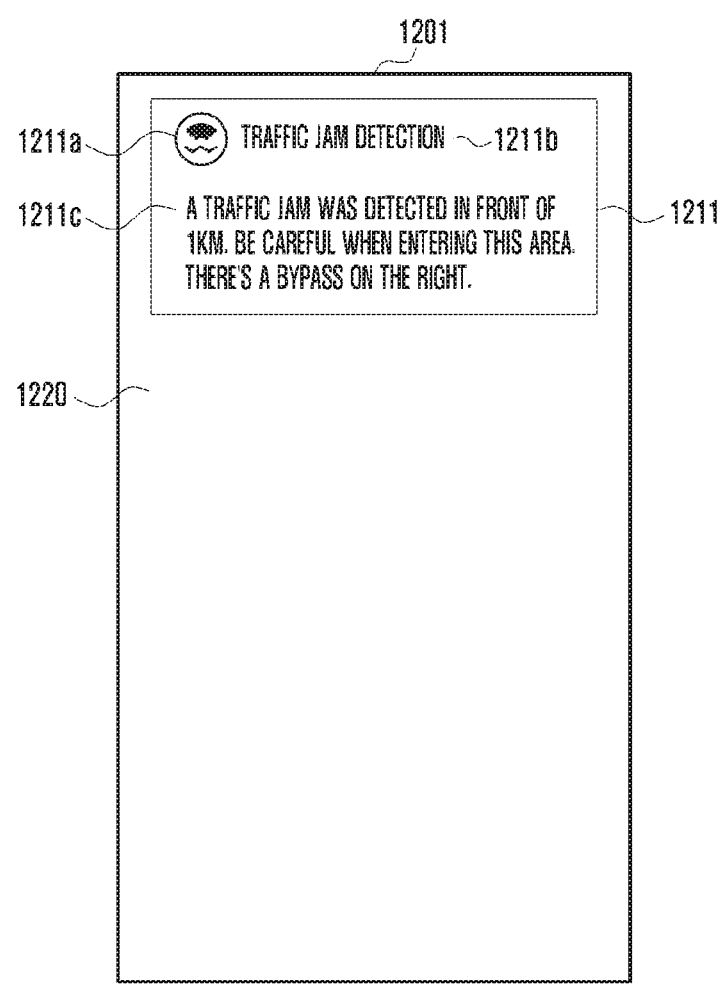
FIGS. 12A, 12B and 12C are diagrams illustrating a process of processing a message according to various embodiments.
Figure 12B:
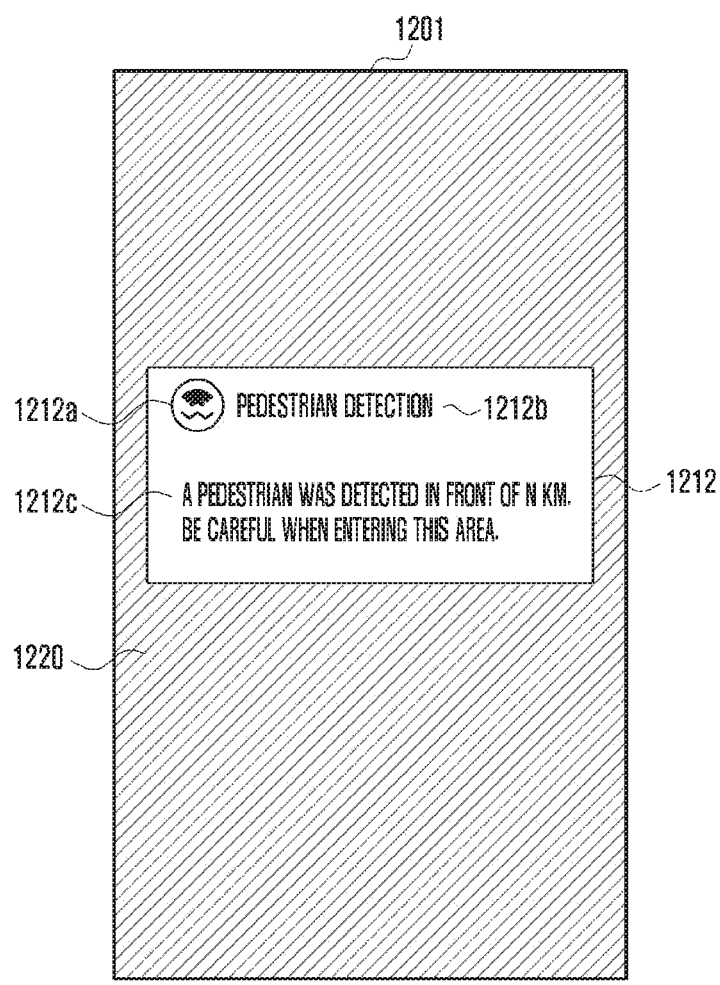
Figure 12C:
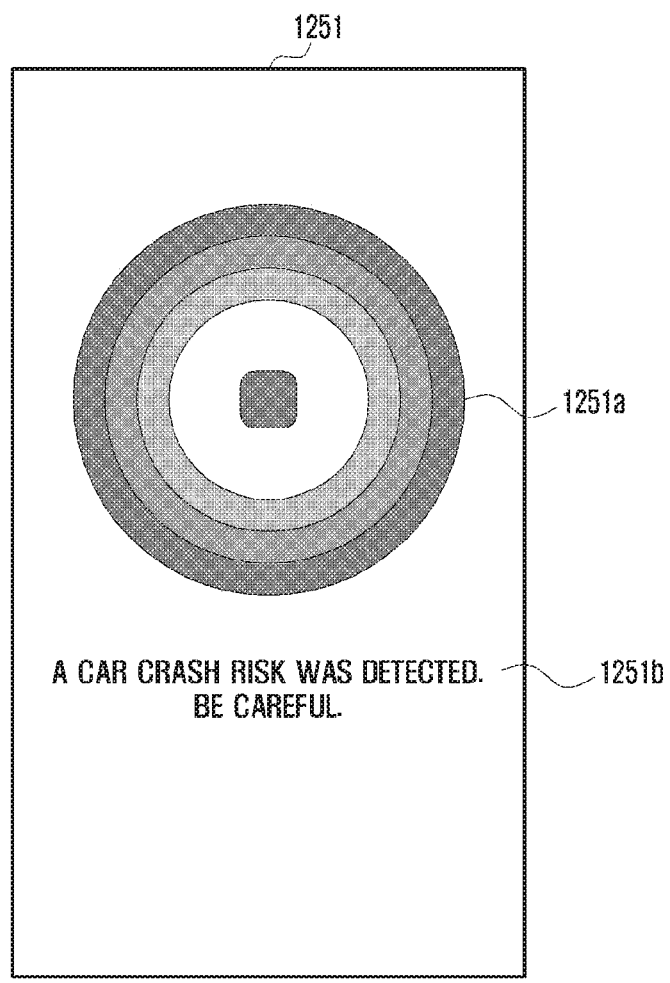

FIGS. 12A, 12B and 12C are diagrams illustrating a process of processing a message according to various embodiments.

FIGS. 12A and 12B illustrate that the message may be displayed differently according to priority. In addition, FIGS. 12B and 12C illustrate that the message may be displayed differently depending on whether an electronic device 1201 is connected to a vehicle or an electronic device 1251 is used by a pedestrian.

In an example embodiment, referring to FIG. 12A, the electronic device 1201 may be connected to a vehicle (not shown). The electronic device 1201 may display a message 1211 related to a low priority event on an upper portion of a display 1220. The message 1211 may include a message icon 1211a, a message title 1211b, and message contents 1211c. For example, the message title 1211b may be "traffic jam detection", and the message contents 1211c may be as follows: "A traffic jam was detected in front of 1 km. Be careful when entering this area. There's a bypass on the right." Also, the electronic device 1201 may output the message 1211 by voice to the user. As one example, the electronic device 1201 may output the message title 1211b and the message contents 1211c by voice. As another example, the electronic device 1201 may display the message 1211 on the display 1220 for about two seconds and then output the message title 1211b and the message contents 1211c by voice.

In another embodiment, referring to FIG. 12B, the electronic device 1201 may be connected to a vehicle (not shown). The electronic device 1201 may display a message 1212 related to a high priority event on a central portion of the display 1220. At this time, the electronic device 1201 may darken the display 1220 except for the central portion to highlight the message 1212. As another example, the electronic device 1201 may apply a highlight effect such as a flicking animation effect to the display 1220 or the message 1212. The message 1212 may include a message icon 1212a, a message title 1212b, and message contents 1212c. For example, the message title 1212b may be "pedestrian detection", and the message contents 1212c may be as follows: "A pedestrian was detected in front of N km. Be careful when entering this area." Also, the electronic device 1201 may output the message 1212 by voice to the user. As one example, the electronic device 1201 may output the message title 1212b and the message contents 1212c by voice. As another example, the electronic device 1201 may display the message 1212 on the display 1220 for about two seconds and then output the message title 1212b and the message contents 1212c by voice.

In still another embodiment, referring to FIG. 12C, the electronic device 1251 may be used by a pedestrian. The electronic device 1251 may display both a user interface 1251a and a message 1251b related to a high priority event on a central portion of the display. At this time, the electronic device 1251 may continuously display the message 1251b until a user's touch input is received through the user interface 1251a. Also, the electronic device 1251 may darken the display except for the central portion in order to highlight the user interface 1251a and the message 1251b. For example, the message 1251b may be as follows: "A car crash risk was detected. Be careful." Also, the electronic device 1251 may output the message 1251b by voice to the user. In this case, the electronic device 1251 may continuously output the message 1251b by voice until a user's touch input is received through the user interface 1251a.

Figure 13A:
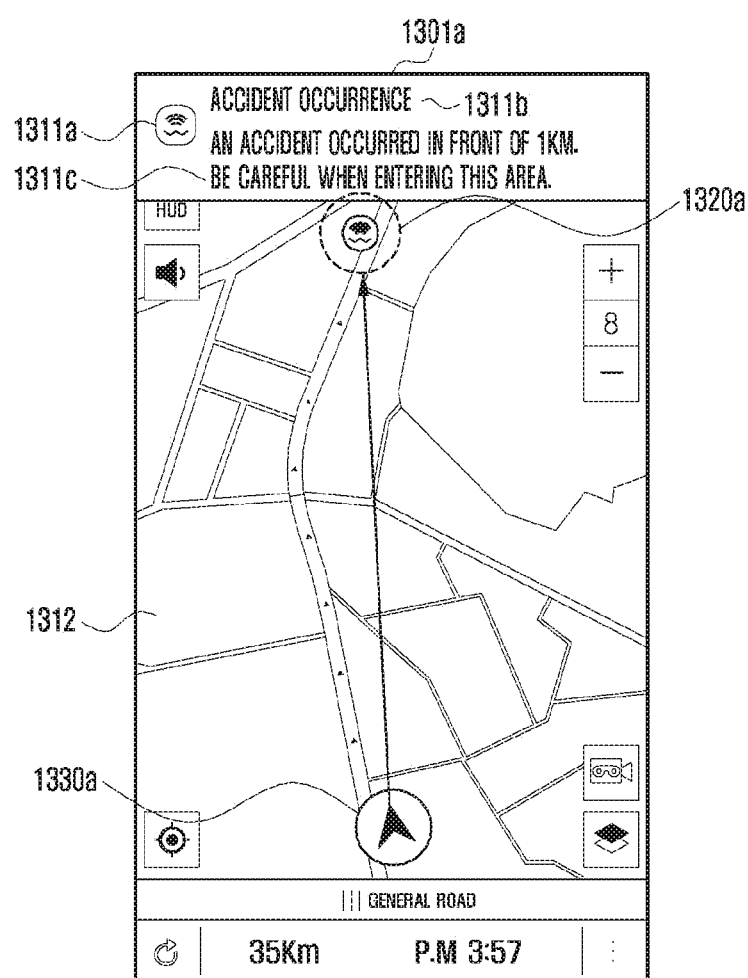
FIGS. 13A, 13B and 13C are diagrams illustrating a process of processing a message according to various embodiments.
Figure 13B:
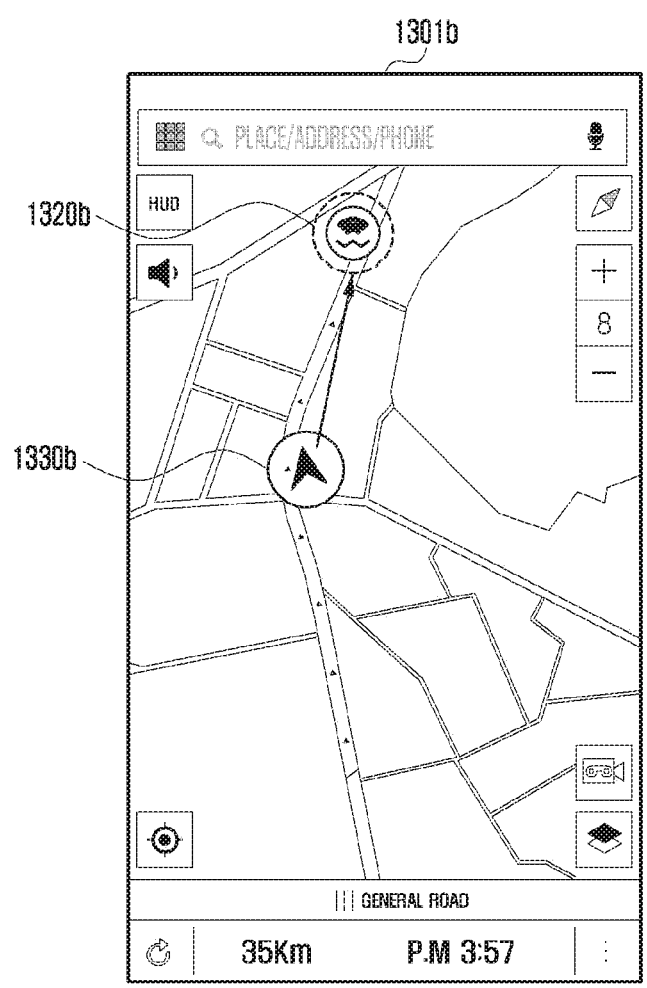
Figure 13C:
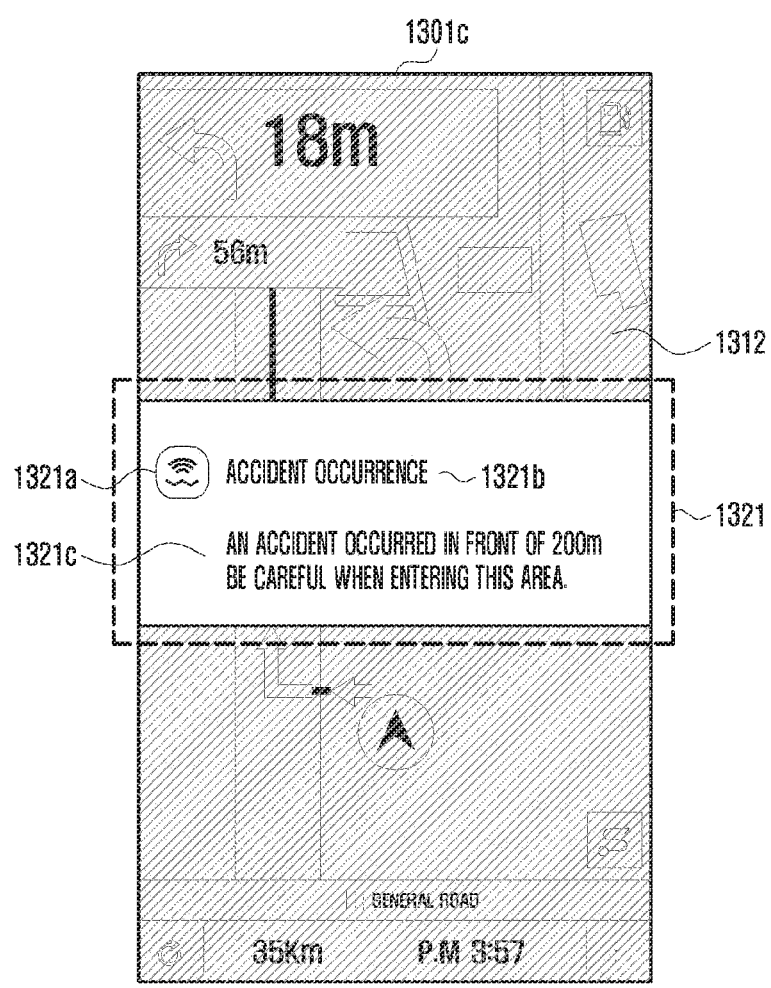

FIGS. 13A, 13B and 13C are diagrams illustrating a process of processing a message according to various embodiments.

FIGS. 13A, 13B and 13C illustrate examples of displaying a message by varying a message display area and an icon size, depending on a processing urgency and a distance between an electronic device and an event occurrence place. For example, even though messages have the same contents, the electronic device may determine the importance of such messages differently according to a distance between the electronic device and the event occurrence place and then display a more important message in a greater size.

In an example embodiment, referring to FIG. 13A, the electronic device 1301a connected to a vehicle (not shown) may execute a navigation application and display a related screen (e.g., a map) on the display. When a certain event occurs, the electronic device may display a location 1330a thereof and an event occurrence place 1320a on a navigation screen 1312 in the form of respective icons. Also, the electronic device may determine that a distance between the event occurrence place 1320a and the electronic device location 1330a is about 1 km. In addition, the electronic device may generate a message related to the event on an upper portion of the display. The message may include a message icon 1311a, a message title 1311b, and message contents 1311c. For example, the message title 1311b may be "accident occurrence", and the message contents 1311c may be as follows: "An accident occurred in front of 1 km. Be careful when entering this area." Also, the electronic device may output the message by voice to the user.

Referring to FIG. 13B, after displaying the message as described above, the electronic device 1301b may continuously monitor a distance between an event occurrence place 1320b and an electronic device location 1330b. As this distance becomes shorter, an icon displayed to represent the event occurrence place 1320b on the screen may be gradually enlarged. That is, in inverse proportion to the distance, the icon of the event occurrence place 1320b may be increased in size. For example, based on the time point the message is initially displayed, the icon size may increase by N % when the distance decreases by N %.

Referring to FIG. 13C, when the distance between the event occurrence place and the electronic device location is smaller than a given threshold while the status of the electronic device 1301c is not changed after the output of the initial message, the electronic device may display a secondary message 1321 on a central portion of the display. The electronic device may enlarge a font size of the secondary message and an icon size of the secondary message. The secondary message 1321 may include a message icon 1321a, a message title 1321b, and message contents 1321c. For example, the message title 1321b may be "accident occurrence", and the message contents 1321c may be as follows: "An accident occurred in front of 200m. Be careful when entering this area." Also, the electronic device may output the secondary message by voice to the user. At this time, a voice output of the secondary message may have a greater volume than the initial message.

According to various embodiments of the present disclosure, when the user of the electronic device is driving a vehicle or walking, the electronic device may output a safety-related WAVE message prior to the execution of other applications.

As one example, if there is a need to output a WAVE message while the user is driving a vehicle with a music application being executed, the electronic device may change the playback of music to a background state, minimize the volume of music, and output the WAVE message.

As another example, if there is a need to output a WAVE message while the user is in a call, the electronic device may mix a voice output of the WAVE message with the other party's call voice and then output it.

As still another example, if the user is in a state of being incapable of seeing the screen of the electronic device, e.g., in a busy state, the electronic device may request an external electronic device (e.g., a wearable device) connected to the electronic device to output the message.

While the present disclosure has been illustrated and described with reference to various example embodiments thereof, it will be understood that the examples are merely illustrative and not limiting. It will be understood by those skilled in the art that various changes in form and details may be made therein without departing from the subject matter and scope of the present disclosure.

What is claimed is:

1. An electronic device comprising:
a communication module comprising communication circuitry;
a display;
a sound output device comprising sound output circuitry;
a processor electrically connected to the communication module, the display, and the sound output device; and
a memory operatively connected to the processor,
wherein the memory stores instructions that, when executed by the processor, cause the electronic device to:
control the communication module to transmit and/or receive a plurality of pieces of information,
identify a plurality of events based on the plurality of pieces of information,
generate a plurality of messages related to the plurality of events,
determine priorities for each of the plurality of messages based on status information of the electronic device,
output the plurality of messages based on the determined priorities through at least one of: the display or the sound output device,
identify a new event based on new information when new information is received,
determine whether the new event has a higher priority than an event related to a message being currently output,
interrupt the message being currently output when the new event has a higher priority, and
generate and output a message related to the new event.

2. The electronic device of claim 1, wherein the status information of the electronic device is determined by the plurality of pieces of information and includes at least one of: a moving direction of the electronic device, a moving speed of the electronic device, a distance between a location of the electronic device or an occurrence place of at least one of the plurality of events, or a predetermined importance of each of the plurality of events.

3. The electronic device of claim 1, wherein the instructions, when executed by the processor, further cause the electronic device to:
identify a new event based on new information when new information is received,
determine whether the new event has a higher priority than an event related to a message being currently output,
interrupt the message being currently output when the new event has a higher priority, and
generate and output a message related to the new event.

4. The electronic device of claim 1, wherein the instructions, when executed by the processor, further cause the electronic device to:
output the interrupted message again when output of the message related to the new event is complete.

5. The electronic device of claim 4, wherein the instructions, when executed by the processor, further cause the electronic device to:
determine the priority of the interrupted message based on the status information of the electronic device,
determine whether there is a message having a higher priority than the priority of the interrupted message, and
output the interrupted message again when there is no message having a higher priority than the priority of the interrupted message.

6. The electronic device of claim 4, wherein the instructions, when executed by the processor, further cause the electronic device to:
determine whether an amount of output of the interrupted message exceeds a predetermined threshold,
output a part of the interrupted message when the amount of output of the interrupted message exceeds the predetermined threshold, and
output the entire interrupted message again when the amount of output of the interrupted message does not exceed the predetermined threshold.

7. The electronic device of claim 6, wherein the part of the interrupted message includes a title of the interrupted message and/or a non-output part of the interrupted message.

8. An electronic device comprising:
a communication module comprising communication circuitry;
a display;
a sound output device comprising sound output circuitry;
a processor electrically connected to the communication module, the display, and the sound output device; and
a memory operatively connected to the processor,
wherein the memory stores instructions that, when executed by the processor, cause the electronic device to:
control the communication module to transmit and/or receive a plurality of pieces of information,
identify a plurality of events based on the plurality of pieces of information,
generate a plurality of messages related to the plurality of events,
determine priorities for each of the plurality of messages based on status information of the electronic device,
output the plurality of messages based on the determined priorities through at least one of: the display or the sound output device,
wherein the electronic device further comprises:
a sensor module comprising at least one sensor,
wherein the instructions, when executed by the processor, further cause the electronic device to:
display a user interface on the display when an impact detection signal is received from the sensor module, determine whether a touch input and/or a voice input is received within a specific time, and process an emergency message related to the impact when the touch input and/or voice input is not received within the specific time.

9. The electronic device of claim 8, further comprising:
a sensor module comprising at least one sensor,
wherein the instructions, when executed by the processor, further cause the electronic device to:
display a user interface on the display when an impact detection signal is received from the sensor module,
determine whether a voice input is received within a specific time after the user interface is displayed, and
process an emergency message related to the impact when the voice input is not received within the specific time.

10. The electronic device of claim 8, wherein the instructions, when executed by the processor, further cause the electronic device to:
output the interrupted message differently from the messages previously output when the interrupted message is output again.

11. The electronic device of claim 8, wherein the instructions, when executed by the processor, further cause the electronic device to:
output the messages differently based on the priorities when the plurality of messages are output.

12. A method of processing message of an electronic device, the method comprising:
transmitting and/or receiving a plurality of pieces of information;
identifying a plurality of events based on the plurality of pieces of information;
generating a plurality of messages related to the plurality of events;
determining priorities for each of the plurality of messages based on status information of the electronic device;
outputting the plurality of messages based on the determined priorities through at least one of: a display or a sound output device,
identifying a new event based on new information when new information is received;
determining whether the new event has a higher priority than an event related to a message being currently output;
interrupting the message being currently output when the new event has a higher priority; and
generating and outputting a message related to the new event.

13. The method of claim 12, wherein the status information of the electronic device is determined by the plurality of pieces of information and includes at least one of: a moving direction of the electronic device, a moving speed of the electronic device, a distance between a location of the electronic device or an occurrence place of at least one of the plurality of events, or a predetermined importance of each of the plurality of events.

14. The method of claim 12, further comprising:
identifying a new event based on new information when new information is received;
determining whether the new event has a higher priority than an event related to a message being currently output;
interrupting the message being currently output when the new event has a higher priority; and
generating and outputting a message related to the new event.

15. The method of claim 12, further comprising:
outputting the interrupted message again when output of the message related to the new event is complete.

16. The method of claim 15, whether outputting the interrupted message again comprises:
determining whether an amount of output of the interrupted message exceeds a predetermined threshold;
outputting a part of the interrupted message when the amount of output of the interrupted message exceeds the predetermined threshold; and
outputting the entire interrupted message again when the amount of output of the interrupted message does not exceed the predetermined threshold.

17. The method of claim 12, further comprising:
displaying a user interface on the display when an impact detection signal is received from a sensor module;
determining whether a voice input is received within a specific time after the user interface is displayed; and
processing an emergency message related to the impact when the voice input is not received within the specific time.

18. The method of claim 12, wherein outputting the plurality of messages comprises outputting the messages differently based on the priorities when the plurality of messages are output.

19. A method of processing message of an electronic device, the method comprising:
transmitting and/or receiving a plurality of pieces of information;
identifying a plurality of events based on the plurality of pieces of information;
generating a plurality of messages related to the plurality of events;
determining priorities for each of the plurality of messages based on status information of the electronic device;
outputting the plurality of messages based on the determined priorities through at least one of: a display or a sound output device,
displaying a user interface on the display when an impact detection signal is received from a sensor module;
determining whether a touch input and/or a voice input is received within a specific time; and
processing an emergency message related to the impact when the touch input and/or voice input is not received within the specific time.

20. An electronic device comprising:
a communication module comprising communication circuitry;
a display;
a sound output device comprising sound output circuitry;
a processor electrically connected to the communication module, the display, and the sound output device; and
a memory operatively connected to the processor,
wherein the memory stores instructions that, when executed by the processor, cause the electronic device to:
control the communication module to transmit and/or receive a plurality of pieces of traffic information,
identify a plurality of events based on the plurality of pieces of traffic information,
generate a plurality of messages related to the plurality of events,
determine priorities for each of the plurality of messages based on status information of the electronic device, output the plurality of messages based on the determined priorities through at least one of: the display or the sound output device,
identify a new event based on new information when new information is received,
determine whether the new event has a higher priority than an event related to a message being currently output,
interrupt the message being currently output when the new event has a higher priority, and
generate and output a message related to the new event.

* * * * *